(12) United States Patent
Smiley et al.

(10) Patent No.: US 10,534,361 B2
(45) Date of Patent: Jan. 14, 2020

(54) INDUSTRIAL ASSET HEALTH MODEL UPDATE

(71) Applicant: ABB Technology Ltd., Zurich (CH)

(72) Inventors: Karen J. Smiley, Raleigh, NC (US); Steven Thomas Zyglowicz, Leesburg, VA (US); Shakeel M. Mahate, Raleigh, NC (US); Chihhung Hou, Morrisville, NC (US)

(73) Assignee: ABB Schweiz AG, Baden (CH)

( * ) Notice: Subject to any disclaimer, the term of this patent is extended or adjusted under 35 U.S.C. 154(b) by 76 days.

(21) Appl. No.: 14/090,154

(22) Filed: Nov. 26, 2013

(65) Prior Publication Data

US 2014/0365271 A1   Dec. 11, 2014

Related U.S. Application Data

(60) Provisional application No. 61/833,409, filed on Jun. 10, 2013.

(51) Int. Cl.
*G05B 23/02* (2006.01)
*G06Q 10/06* (2012.01)

(52) U.S. Cl.
CPC ..... *G05B 23/0283* (2013.01); *G06Q 10/0635* (2013.01)

(58) Field of Classification Search
CPC ........... G06Q 10/0635; G06Q 10/0637; G06Q 10/04; G06Q 10/06; G06Q 10/20; G06Q 50/06
See application file for complete search history.

(56) References Cited

U.S. PATENT DOCUMENTS 5,258,310 A * 11/1993 Abe ................... G01N 33/2835
                                                          436/175
6,037,592 A *  3/2000 Sunshine ........... G01N 21/3504
                                                          250/343

(Continued)

FOREIGN PATENT DOCUMENTS

CN   102313577 A   1/2012
CN   102324067 A   1/2012

OTHER PUBLICATIONS

"The Basics of Arc Flash," by Cameron G. Clark, General Electric Industrial Solutions, available at <https://www.geindustrial.com/sites/geis/files/gallery/The-Basics-of-Arc-Flash-Article_GE_Industrial_Solutions_0.pdf>, accessed Nov. 1, 2016.*

(Continued)

*Primary Examiner* — Tyler W. Knox
(74) *Attorney, Agent, or Firm* — Barnes & Thornburg LLP

(57) ABSTRACT

Among other things, one or more techniques and/or systems are provided for generating a health profile of an industrial asset based upon data pertaining to such an industrial asset. The health profile describes an expected condition of the industrial asset during a prediction period, a predicted cause of the expected condition, and/or a predicted impact of the expected condition. In some embodiments, the health profile is generated using a model that is configured to be periodically and/or intermittently updated. Further, in some embodiments, a diagnostic profile may be generated describing diagnostic actions that may be taken to improve predictions included within a health profile and/or to improve a confidence in one or more of those predictions.

20 Claims, 10 Drawing Sheets

---

```
                                                                    ┌─ 1000

DIAGNOSIS PROFILE FOR MODEL # 1865

Suggested Changes to Alter Data Quantity:                    ◄─ 1002

Decrease, by three-fold, number of dissolved hydrogen concentration samplings
   Perform monthly field test on transformer
   Add sensor to measure dissolved acetylene concentration Suggested Changes to Alter Data Quality:                     ◄─ 1004

Replace sensor for measuring dissolved gas concentrations with new sensor, model 145
```

(56) References Cited

U.S. PATENT DOCUMENTS

| | | | |
|---|---|---|---|
| 7,103,509 B2* | 9/2006 | Shah | G01D 1/00 700/52 |
| 7,409,371 B1 | 8/2008 | Heckerman et al. | |
| 7,478,071 B2 | 1/2009 | Kadambe | |
| 7,577,548 B1* | 8/2009 | Przytula | G06N 7/005 702/182 |
| 8,423,397 B2 | 4/2013 | Sitton | |
| 8,571,911 B1* | 10/2013 | Meyer | G06Q 10/04 705/7.12 |
| 8,615,374 B1* | 12/2013 | Discenzo | G06F 15/00 219/497 |
| 8,793,081 B1* | 7/2014 | Loverich | G01L 5/0004 340/683 |
| 9,138,786 B2* | 9/2015 | McKay | B08B 9/02 |
| 9,311,615 B2* | 4/2016 | Davenport | G06Q 10/063 |
| 9,599,653 B2* | 3/2017 | Kim | G01R 31/027 |
| 2002/0078403 A1* | 6/2002 | Gullo | G06F 11/008 714/37 |
| 2002/0114433 A1* | 8/2002 | Katou | G05B 23/0275 379/106.01 |
| 2002/0161558 A1* | 10/2002 | Georges | G05B 23/0245 702/189 |
| 2002/0166973 A1* | 11/2002 | Frederick | E21C 35/24 250/361 R |
| 2003/0023534 A1* | 1/2003 | Kadambe | G06K 9/6217 705/36 R |
| 2003/0055666 A1* | 3/2003 | Roddy | B61L 27/0094 705/305 |
| 2003/0061004 A1* | 3/2003 | Discenzo | G05B 13/024 702/182 |
| 2004/0158772 A1 | 8/2004 | Pan et al. | |
| 2005/0007106 A1* | 1/2005 | Goldfine | G01N 27/82 324/228 |
| 2005/0141682 A1* | 6/2005 | Wells | H02J 3/00 379/90.01 |
| 2005/0216503 A1 | 9/2005 | Charlot et al. | |
| 2006/0004499 A1* | 1/2006 | Trego | B64D 45/00 701/31.4 |
| 2006/0064456 A1 | 3/2006 | Kalthoff et al. | |
| 2006/0259277 A1* | 11/2006 | Fantana | G06Q 10/06 702/183 |
| 2007/0021915 A1* | 1/2007 | Breed | B60N 2/2863 701/301 |
| 2007/0056374 A1* | 3/2007 | Andrews | G01N 29/4418 73/628 |
| 2007/0192065 A1* | 8/2007 | Riggs | G06Q 10/04 702/189 |
| 2007/0249319 A1* | 10/2007 | Faulkner | H04L 1/22 455/402 |
| 2008/0262736 A1* | 10/2008 | Thigpen | E21B 43/128 702/9 |
| 2008/0319811 A1 | 12/2008 | Casey | |
| 2009/0037206 A1* | 2/2009 | Byrne | G06Q 10/06 705/305 |
| 2009/0088875 A1 | 4/2009 | Baier et al. | |
| 2009/0089225 A1* | 4/2009 | Baier | G06Q 10/06 706/12 |
| 2009/0094174 A1 | 4/2009 | Kussmaul | |
| 2009/0113049 A1* | 4/2009 | Nasle | G05B 13/026 709/224 |
| 2009/0210081 A1* | 8/2009 | Sustaeta | G05B 13/0285 700/99 |
| 2009/0228129 A1 | 9/2009 | Moyne et al. | |
| 2009/0271235 A1* | 10/2009 | Kubota | G06Q 10/06 705/7.11 |
| 2010/0100248 A1* | 4/2010 | Minto | F01D 11/20 700/287 |
| 2010/0153156 A1 | 6/2010 | Guinta | |
| 2010/0198635 A1* | 8/2010 | Pirtle | G06Q 10/04 705/7.41 |
| 2010/0268391 A1 | 10/2010 | Anderson | |
| 2010/0286841 A1* | 11/2010 | Subbloie | G06F 1/28 700/295 |
| 2011/0227558 A1* | 9/2011 | Mannion | B82Y 30/00 324/71.1 |
| 2011/0276498 A1* | 11/2011 | Madhok | G06Q 10/00 705/302 |
| 2011/0283145 A1* | 11/2011 | Nemecek | G06F 11/008 714/37 |
| 2012/0116696 A1* | 5/2012 | Wank | G01R 31/42 702/58 |
| 2012/0123705 A1* | 5/2012 | Drahm | G01F 1/8413 702/54 |
| 2012/0143565 A1* | 6/2012 | Graham, III | G05B 23/0237 702/181 |
| 2012/0209505 A1* | 8/2012 | Breed | G01C 21/3697 701/409 |
| 2012/0255933 A1* | 10/2012 | McKay | B08B 9/02 219/61 |
| 2012/0290104 A1* | 11/2012 | Holt | G06Q 10/00 700/29 |
| 2013/0041705 A1* | 2/2013 | Hampapur | G06Q 10/06 705/7.12 |
| 2013/0268196 A1* | 10/2013 | Dam | G01W 1/00 702/3 |
| 2014/0053626 A1* | 2/2014 | Jeffrey | G01N 33/2841 73/19.1 |
| 2014/0200952 A1* | 7/2014 | Hampapur | B61K 9/08 705/7.28 |
| 2014/0245814 A1* | 9/2014 | Montanari | G01N 33/2841 73/19.1 |
| 2014/0330609 A1* | 11/2014 | Candas | G06Q 10/06313 705/7.23 |
| 2014/0365191 A1* | 12/2014 | Zyglowicz | G06F 17/5009 703/7 |
| 2015/0379429 A1* | 12/2015 | Lee | G09B 5/00 706/11 |

OTHER PUBLICATIONS

"SCADA Systems" white paper, by Schneider Electric Telemetry & Remote SCADA Solutions, Mar. 2012, available at <http://www.schneider-electric.com/solutions/ww/EN/med/20340568/application/pdf/1485_se-whitepaper-letter-scadaoverview-v005.pdf>, accessed Apr. 27, 2017.*

"Current Status of Machine Prognostics in Condition-Based Maintenance: A Review", Ying Peng, Ming Dong and Ming Jian Zuo, Jan. 6, 2010, The International journal of Advanced Manufacturing Technology, Springer, Berlin, DE, vol. 50, No. 1-4, 18 pgs.

Int. Search Report cited in PCT Application No. PCT/US2014/041663 dated Sep. 1, 2014, 13 pgs.

Int. Preliminary Report cited in PCT Application No. PCT/US2014/041663 dated Dec. 15, 2015, 8 pgs.

EP Communication cited in EP Application No. 141714453.5 dated Jul. 15, 2016, 7 pgs.

Extended EP Search Report cited in EP Application No. 14171453.5 dated Aug. 1, 2014, 8 pgs.

1st Office Action for CN 201410254005.7 dated Nov. 2, 2018, with English language translation, 19 pages.

* cited by examiner

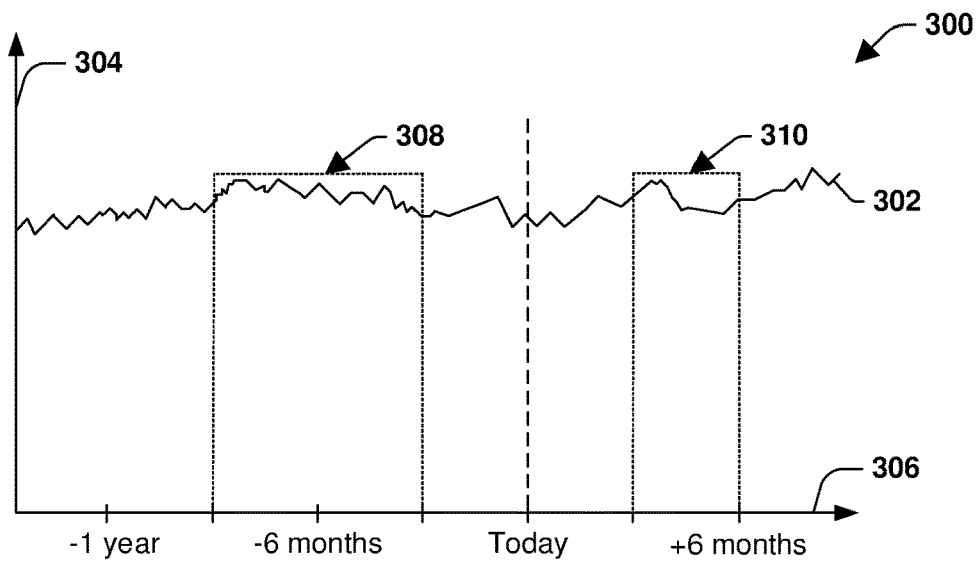
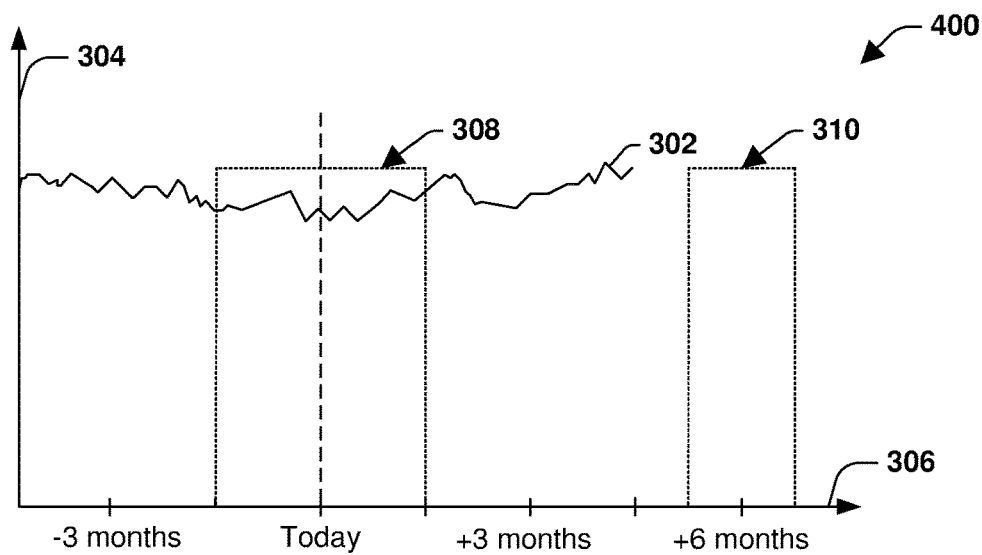
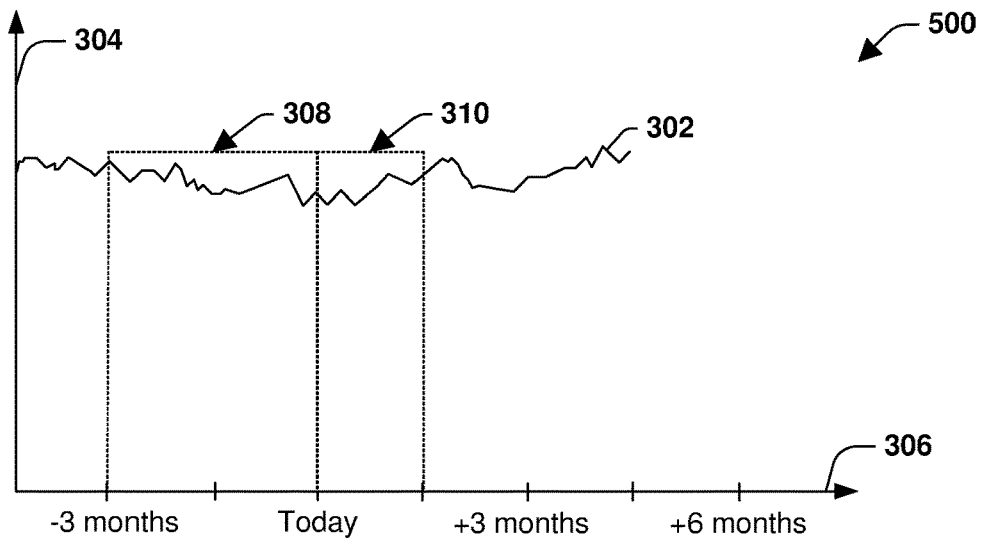

INDUSTRIAL ASSET HEALTH MODEL UPDATE

CROSS REFERENCE TO RELATED APPLICATIONS

This application claims the benefit of U.S. Provisional Application 61/833,409, filed on Jun. 10, 2013 and entitled "Model Development and Updating," which is incorporated herein by reference.

BACKGROUND

The present application relates to industrial assets and more particularly to systems and/or techniques for selecting and/or updating models configured to diagnose past, present, or expected future health conditions of industrial assets and/or causes of those conditions. The systems and/or techniques find particular application to industrial assets of a power system, such as equipment of a generation sub-system, transmission sub-system, and/or distribution sub-system. However, the systems and/or techniques may also find applicability in non-power related industries where it may be useful to analyze data pertaining to an industrial asset to generate a health profile that describes past, present, or expected future conditions of the industrial asset and/or likely cause(s) of the conditions.

A power system comprises a fleet of industrial assets comprising electrical equipment and non-electrical equipment used to generate, supply, transmit, and/or consume or convert electrical power. Industrial assets of such a power system are usually designed to last decades and perform a critical role in supplying power to consumers. Accordingly, a substantial amount of resources (e.g., time, money, staffing, etc.) are typically dedicated to maintenance planning and early detection of possible failures.

Often, a maintenance schedule is initially devised for an industrial asset based upon a manufacturer's recommended maintenance schedule, and this maintenance schedule may be revised according to events (e.g., usage and/or performance of the industrial asset, trouble reports, outage reports, and/or inspections performed on the industrial asset). By way of example, a yearly inspection may be performed on a distribution sub-station to identify early signs of fatigue, excessive wear, and/or reduced performance. As another example, data may be collected from sensors associated with the industrial asset and analyzed to identify performance changes that may indicate maintenance is needed and/or to identify early indicators of an imminent failure.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to an aspect, a method is provided. The method comprises generating a health profile of an industrial asset using a model. The health profile describes an expected condition of the industrial asset during a prediction period and is generated based upon data generated during an assessment period and indicative of the industrial asset. The method also comprises receiving data generated during the prediction period and indicative of the industrial asset and updating the model based upon a comparison of the data generated during the prediction period with the health profile.

According to another aspect, a system is provided. The system comprises a model development component configured to develop a model and a profile generation component configured to generate a health profile of an industrial asset using the model. The health profile describes an expected condition of the industrial asset during a prediction period. The system also comprises a model update component configured to update the model based upon a comparison of the health profile with data generated during the prediction period and indicative of the industrial asset.

According to yet another aspect, a computer readable medium comprising computer executable instructions that when executed perform a method is provided. The method comprises generating a health profile of an industrial asset using a model. The health profile describes an expected condition of the industrial asset during a prediction period and is generated based upon data generated during an assessment period and indicative of the industrial asset. The method also comprises receiving data generated during the prediction period and indicative of the industrial asset and updating the model based upon a comparison of the data generated during the prediction period with the health profile.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 3 illustrates an example graph describing an assessment period and a prediction period.

FIG. 4 illustrates an example graph describing an assessment period and a prediction period.

FIG. 5 illustrates an example graph describing an assessment period and a prediction period.

DETAILED DESCRIPTION

Figure 1:
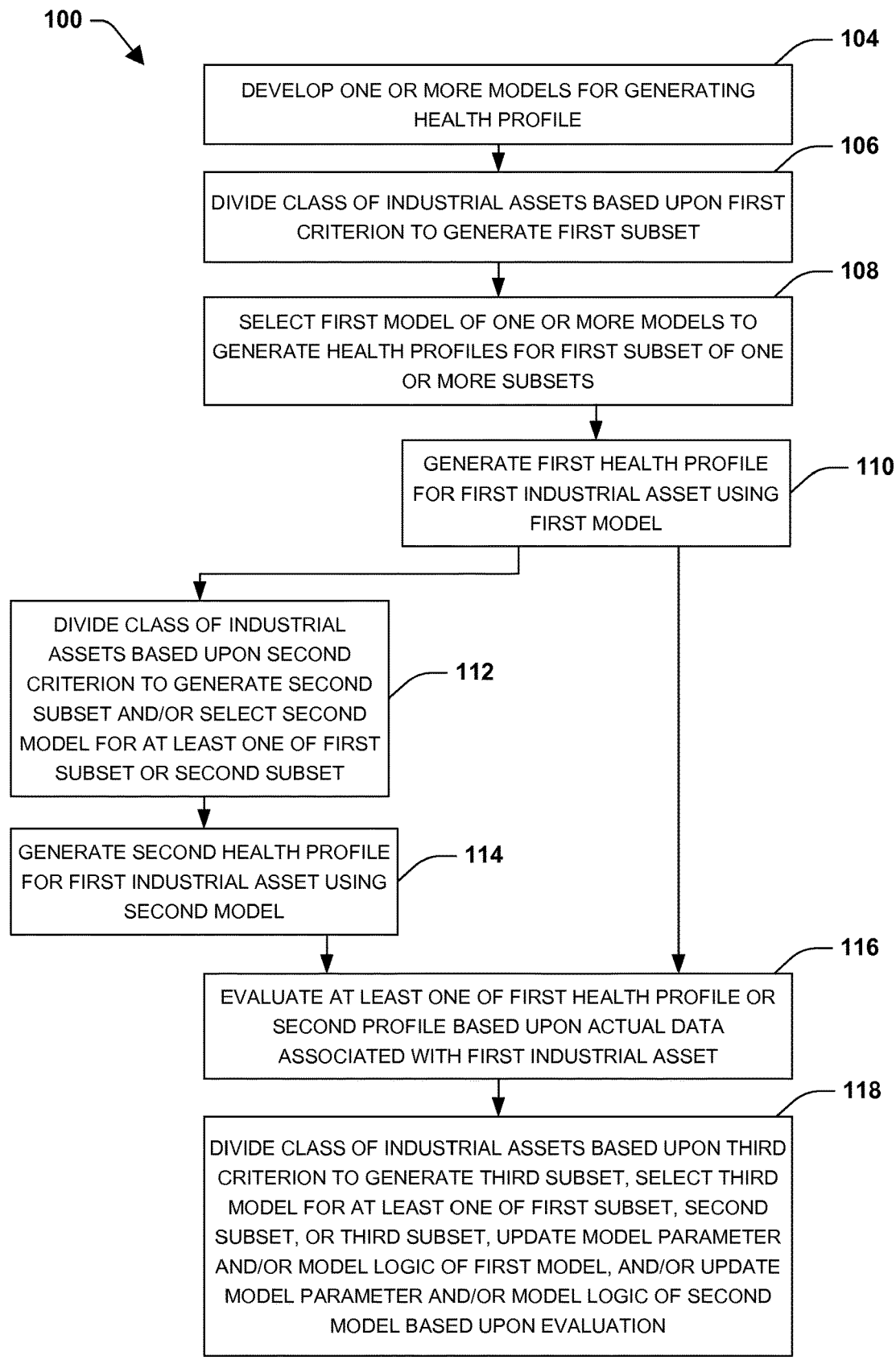
FIG. 1 is a flow diagram illustrating an example method according to some embodiments.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

As used herein, a confidence profile describes a confidence in the probability of an event (e.g., condition, cause, impact, etc.) occurring or not occurring. The confidence profile may be based upon the type of data from which the probability was determined, a quality of the data (e.g., an accuracy of a sensor or other tool utilized to generate the data), a quantity of data available from which to compute the probability, and/or how strongly that data correlates with the outcome (e.g., how strongly the data used serves as an indicator of a condition, cause, etc.). The confidence profile may be a numerical score (e.g., 90% confidence in the condition), may be a range (e.g., 85-92% confidence in the condition), may follow a distribution function, and/or may describe a cone of uncertainty (e.g., where there is a first confidence associated with the likelihood of a condition occurring within the next 3 months and a second confidence associated with the likelihood of a condition occurring with the next 6 months), for example.

Also, condition is used herein in a broad sense to describe the state of something, such as its appearance, quality, and/or working order. It may be appreciated that by understanding/assessing the condition of an element, the performance of an asset may also be understood/assessed. For example, an industrial asset with a first condition (e.g., causing the industrial asset to be in a weakened state) may be unable to perform functions that a second industrial asset not experiencing the first condition may be able to perform. Thus, determining the condition of an industrial asset is intended to include determining condition considerations (e.g., state of something) and/or performance considerations (e.g., ability to perform an action or process given the condition). Further, diagnosis is used herein in a broad sense to describe the act of identifying the nature and/or cause of a condition, which may provide insight into the prognosis of an industrial asset (e.g., where the prognosis is indicative of how something will develop). Thus, diagnosing a condition is intended to include diagnosing a cause of the condition as well as a prognosis given the condition and/or cause.

Moreover, industrial asset is used herein to describe a piece of equipment, element thereof, and/or a group of equipment logically and/or physically assembled together to form a production unit. Examples of such industrial assets may include a transformer, bushing, circuit breaker, substation (e.g., comprising one or more transformers and/or one or more circuit breakers), transmission tower, power generator, etc. The industrial assets may also include auxiliary items which are used to access, restrict access, and/or service the equipment, such as fences, access roads, etc.

A power system comprises thousands if not millions of industrial assets (e.g., including electrical and non-electrical equipment) which require maintenance to operate efficiently and/or to reduce the probability or impact of a failure. Electrical equipment of such a system may include, among other things, turbines, transformers, circuit breakers, capacitors, voltage regulators, batteries, and power lines, for example. Non-electrical equipment of such a system may include, among other things, storage cabinets, poles, and transmission towers, for example.

Utility providers and other entities routinely monitor and/or inspect such industrial assets to assess the health of the industrial asset and/or to develop a maintenance plan for the industrial asset. For example, sensors may be associated with an industrial asset and may be configured to measure various properties of the industrial assets (e.g., internal temperature, ambient air temperature, dissolved gas concentration, load, stresses on the industrial asset, structural fatigue of the industrial asset, etc.). Over time, a data record of the industrial record is formed which comprises data pertaining to sensor readings, inspections, outages, maintenance, heat run tests, design specifications, etc.

Recently, health models have been developed that are configured to analyze at least a portion of a data record of an industrial asset to assess the health of the industrial asset and/or to identify industrial assets that are in need of maintenance. While these models are useful, the initial models are typically developed for a class or subclass of industrial asset (e.g., transformer, circuit breaker, etc.), may not distinguish particular subsets of the class (e.g., where subsets may be based upon manufacturer, voltage class, operating climate, etc.) and/or may not be updated (e.g. fine-tuned) to consider actual predictive accuracy for various subsets. Moreover, depending upon how the industrial assets are sorted or divided into subsets, different model techniques may provide better predictions under different operating circumstances. For example, a first type of model (e.g., flow chart model) may more accurately predict the health of a first subset of industrial assets (e.g., transformers manufactured by a first manufacturer) and a second type of model (e.g., Bayesian Belief Network model) may more accurately predict the health of a second subset of industrial assets. Additionally, the initial models may require certain sets of data inputs and/or certain diagnostic analyses as the basis for a health prediction, without explicit consideration of whether having more or less data and/or conducting more or fewer diagnostic analyses provides meaningful improvement in the practical usefulness of the model's outputs for decision making. Since acquiring data and/or conducting diagnostic analyses can be costly and/or can interfere with operational performance, updating the initial models to address such considerations can be advantageous to an industrial business.

Accordingly, systems and/or techniques are described for identifying subsets of industrial assets (e.g., where a subset corresponds to a group of industrial assets that share a common set of characteristics), selecting a model that (e.g., best) predicts the health of the subset, iteratively updating the model based upon differences and/or similarities between forecasts generated by the model and the actual health of industrial assets included within the subset during a period applicable to the forecast, and/or determining for respective industrial assets or a group of assets which model(s) or combination of models (e.g., such as meta-models that consider output from multiple models) provides an effective (e.g., most effective) prediction for the business purposes of the industrial entity. While the foregoing technique describes identifying subsets of industrial assets before selecting the model, in other embodiments, the selection of a model may occur prior to the identification of subsets (e.g., where criteria which define how the industrial assets are to be sub-divided are chosen based upon the model). Moreover, in some embodiments, the process of identifying subsets, selecting a model, and/or updating the model is an iterative process. Thus, new subsets may be formed and/or different models may be selected during subsequent iterations as a function of the accuracy of predictions (e.g., how accurately a model was able to forecast the health of industrial assets within a subset) and/or a confidence in those predictions (e.g., the certainty in the forecast at the time the forecast is made), for example. Accordingly, the criteria used to sort industrial assets into subsets (e.g., to identify similar industrial assets), the model selected to analyze industrial assets of a subset, and/or features of the model (e.g., model parameters and/or model logic) may be refined over a period of time to achieve specified objectives (e.g., a specified confidence in a forecast, a specified forecasting period, etc.).

As will be described in more detail below, models are typically configured to generate health profiles of industrial assets based upon at least a portion of a data record of an industrial asset. The health profile is indicative of a predicted health of the industrial asset during a prediction period and may provide insight into the industrial asset that is useful to business planners and/or maintenance planners, for example. The health profile may include a condition(s) that is expected to impact the industrial asset during a prediction period, an impact(s) of the condition(s) during the prediction period, and/or a cause(s) of the condition(s). In some embodiments, a learning feature is configured to update an aspect of the model based upon discrepancies between the predicted health and the actual health of the industrial asset during the prediction period (e.g., was a predicted condition present, was a cause of the condition correctly predicted, was the impact of the condition correctly predicted, etc.). By way of example, model logic and/or model parameters may be refined based upon the discrepancies to update the model and/or improve an accuracy of the model. Moreover, a different model may be selected for generating a health profile of an industrial asset based upon the discrepancies, and/or different criteria may be used to sort industrial assets into subsets based upon the discrepancies, for example.

In some embodiments, one or more user specified factors may influence how and/or whether the model is selected and/or updated by the learning feature. By way of example, in power systems where safety is a concern, a business objective of an entity reliant upon the model may be to reduce false negatives (e.g., where an unhealthy industrial asset is classified as healthy). Thus, the learning feature may update the model in ways that reduce the number of false negatives while potentially increasing the possibility of a false positive (e.g., where a health industrial asset is classified as unhealthy) and/or total false readings. By way of example, the learning feature may update model logic to identify a transformer as less healthy even when a probability of the transformer having an unhealthy level of insulation degradation is low, because the learning feature may take into consideration the desire to reduce false negatives (e.g., at the risk of increasing false positives). As another example, the learning feature may consider cost factors and/or resource burdens when updating the model. For example, the learning feature may determine that making an update to the model would result in an additional 1000 assets being classified as unhealthy that were previously classified as healthy. Such an increase may substantially increase the burden on maintenance crews and/or may make it more difficult for maintenance crews to prioritize maintenance. Accordingly, the learning feature may reevaluate the model to identify other model logic and/or model parameters that could be changed to reduce the number of assets that would be reclassified due to the update. As another example, the learning feature may determine that more or fewer classification levels would be useful for classifying health of assets. As yet another example, the learning feature may update the model to weight various conditions and/or causes differently. By way of example, the learning feature may update the model to weight conditions and/or causes that pose a substantial fire risk (e.g., such as degraded insulation) more heavily than conditions and/or causes that pose little to no fire risk when determining an overall health of the industrial asset. Thus, the learning feature may update a model based upon the business interest such that an industrial asset that has degraded insulation but is otherwise healthy may be given an overall health score that is less than another industrial asset that may have more problems but is at less of a risk for fire.

Referring to FIG. 1, an example method 100 according to some embodiments is illustrated. It will be appreciated that the example method 100 is merely intended to provide an overview, and that additional flow diagrams are provided to describe respective acts of the method 100. At 104 in the example method 100, one or more models are developed for generating health profiles. The models may be generated programmatically (e.g., based upon historical data yielded from one or more industrial assets of a class to which the model relates) and/or by subject matter experts. Upon completion, these models are typically stored in a data store for later retrieval when developing a health profile for a particular industrial asset.

At 106 in the example method 100, a class of industrial assets is divided into one or more subsets, including a first subset, based upon one or more criteria (e.g., where class may be defined as a group of industrial assets configured to perform a similar function). Such criteria may include voltage class, operating environment, manufacturer, output production, loading capacity, etc. The initial division of industrial assets may be based upon user specified criterion/criteria, may be programmatically selected based upon model parameters of at least one of the models developed at 104, and/or may be random. For example, a class of industrial assets may be sub-divided into one or more subsets based upon a default criterion/criteria, such as voltage class, during an initial division. Subsequently, the criterion/criteria used to sub-divide the class of industrial assets may be updated based upon differences between forecasts of events and actual events during the forecasted period, for example.

It is to be appreciated that while the example method 100 illustrates the division as occurring after the development of the one or more models, in some embodiments, the division at 106 is independent of the development at 104. In still other embodiments, the division at 106 occurs before the development at 104 (e.g., and the development is a function of the criterion/criteria used to divide the class of industrial assets).

At 108, a first model of the one or more models is selected to generate health profiles for the first subset of industrial assets. The first model may be selected at random, may be user specified, and/or may be based upon the criterion/criteria used to divide the class of industrial assets into subsets at 106. By way of example, a user may specify that health profiles for industrial assets of respective subsets are to be generated using a first model (e.g., such as a flow chart model). As will be described in more detail below, based upon the health profiles that are produced by the first model (e.g., the confidences in the forecast) and/or based upon differences between the forecasts of the first model and actual events during the forecasted period, for example, the model that is used to generate a health profile of a given industrial asset may change over time.

As another example, the first model may be selected based upon the criterion/criteria used to divide industrial assets into subsets. For example, it may be believed that the first model is more accurate at forecasting transformers manufactured by a first manufacturer and that a second model is more accurate at forecasting transformers manufactured by a second manufacturer. Accordingly, if transformers are divided at 106 based upon manufacturer, the first model may be selected to generate health profiles for the first subset of transformers, which are manufactured by the first manufacturer, and the second model may be selected to generate health profiles for a second subset of transformers, which are manufactured by the second manufacturer. Again, as will be described below, the model that is selected for a particular subset may change over time based upon changes to the criterion/criteria used to divide a class of industrial assets and/or changes in the understanding of the interplay between manufacturer and model (e.g., over time it may become evident that the accuracy of the model is not as manufacturer dependent as once believed), for example.

At 110 in the example method 100, the first model is used to generate a first health profile for a first industrial asset of the first subset. The first health profile describes the expected health of the first industrial asset during a prediction period (e.g., which may be user specified or may be specified as a model parameter). By way of example, upon a triggering event (e.g., user initiation, time period lapsed, environmental event, operating event, etc.), at least a portion of the data record of the first industrial asset may be provided to the first model, which analyzes the portion of the data record to generate a first health profile of the first industrial asset. The first health profile may describe, among other things, the current health of the first industrial asset, one or more expected conditions of the first industrial asset during the prediction period (e.g., during a forecast window), one or more causes of at least some of the expected conditions, and/or an expected health of the first industrial asset during the prediction period (e.g., such as at the beginning or end of the prediction period), for example. At least some of the predictions included with the health profile may be associated with a confidence profile describing the confidence in the prediction (e.g., forecast).

At 112 in the example method 100, the class of industrial assets may be optionally re-divided into a second set of subsets based upon second criterion/criteria (e.g., where based upon the re-division, the first industrial asset is part of a second subset) and/or a second model may be optionally selected to generate health profiles for at least one of the first subset or the second subset of industrial assets. By way of example, the degree of confidence in the overall health profile and/or in one or more predictions contained therein may be less than a specified threshold. Accordingly, the criterion/criteria used to sub-divide a class of industrial assets and/or the selected model maybe updated in an effort to improve the confidence in the overall health profile and/or in the one or more predictions. By way of example, a second model may be selected for the first subset of industrial assets based upon the first health profile, and the data record of the first industrial asset may be provided to the second model to generate a second health profile for the first industrial asset using the second model at 114. In some embodiments, such as process may continue until desired stopping criteria are satisfied (e.g., respective models in a data store have been tested, the confidence profile of the health profile satisfies specified thresholds, etc.).

At 116 in the example method 100, the first health profile and/or the second health profile are evaluated based upon actual data associated with the first industrial asset that was collected during a prediction period of the first health profile and/or second health profile. During such an evaluation, differences between actual events (e.g., actual causes and/or conditions) and predicted event may be identified and/or similarities between actual events and predicted events may be identified.

At 118 in the example method 100, the differences and/or similarities between the actual events and the predicted events may be used to update model logic and/or model parameters of the first model and/or second model, to update criterion/criteria used to divide the class of industrial assets into subsets (e.g., where based upon the re-division, the first industrial asset is part of a third subset), and/or to select a third model for generating health profiles for at least one of the first subset, the second subset, and/or the third subset. In this way, model logic, model parameters, the type of model used, and/or the criterion/criteria for dividing industrial assets may be updated (e.g., refined) based upon the evaluation.

It will be appreciated that while reference is made to using data from a single industrial asset to update model logic, model parameters, the type(s) of model used, and/or the criterion/criteria for dividing industrial assets may be updated, data from a plurality of industrial assets may be used to determine whether updating is desirable and/or what to update. For example, a machine learning algorithm may pool data from a plurality of industrial assets to identify trends and/or patterns that may suggest whether it is better to update the criterion/criteria for division of industrial assets, or to select a different model, or to update a model parameter(s) of the model previously selected for the subset, or to update model logic of the model previously selected for the subset, or to combine two or more models, or a combination of one or more of these considerations.

Figure 2:
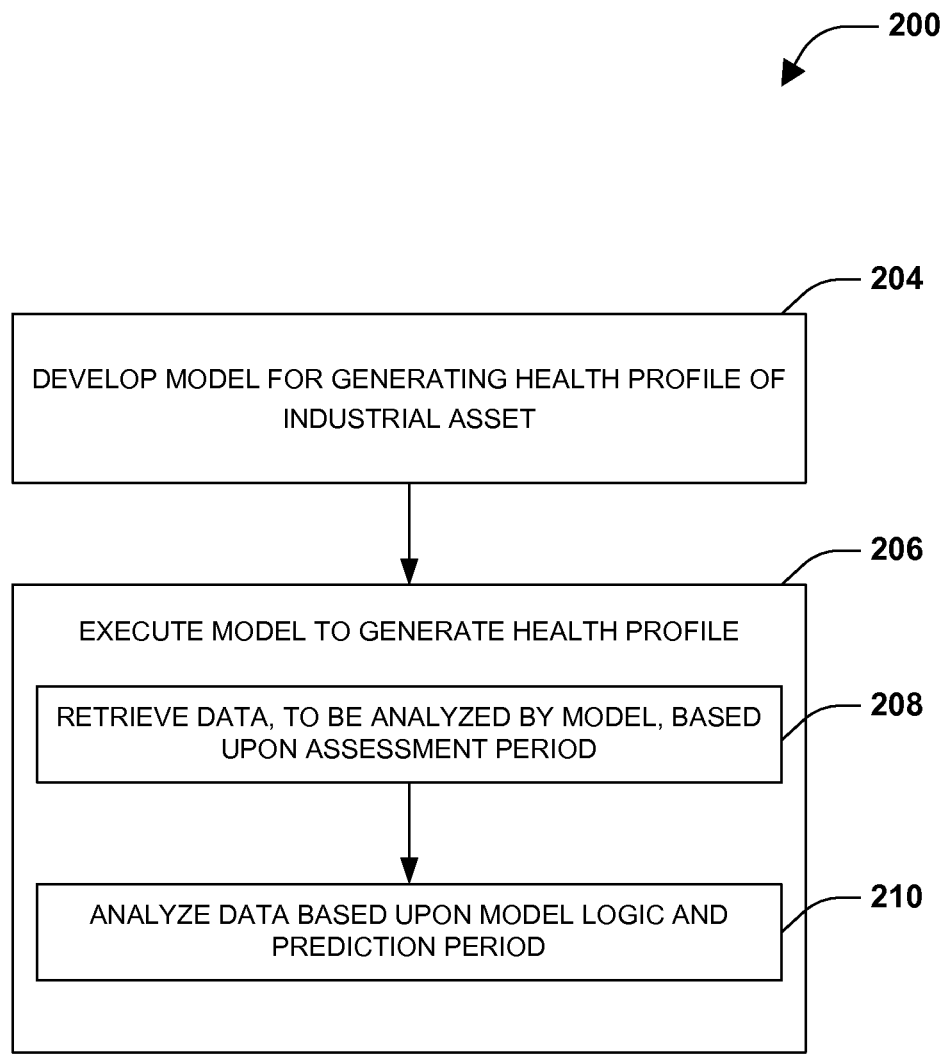
FIG. 2 is a flow diagram illustrating an example method for developing and applying a health profile of an industrial asset.

Referring to FIG. 2, an example method 200 for generating a health profile of an industrial asset (e.g., such as a first industrial asset of a first subset of industrial assets) is described. It may be appreciated that while reference is made herein to generating a health profile of a single asset, a similar method 200 may be utilized to generate health profiles for a plurality of industrial assets.

At 204 in the example method 200, a model is developed for generating the health profile of the industrial asset (e.g., 104 in FIG. 1). The model describes a process for analyzing data associated with the industrial asset to predict or forecast a condition of the industrial asset during a prediction period, a cause of the condition, and/or an impact of the condition.

Figure 6:
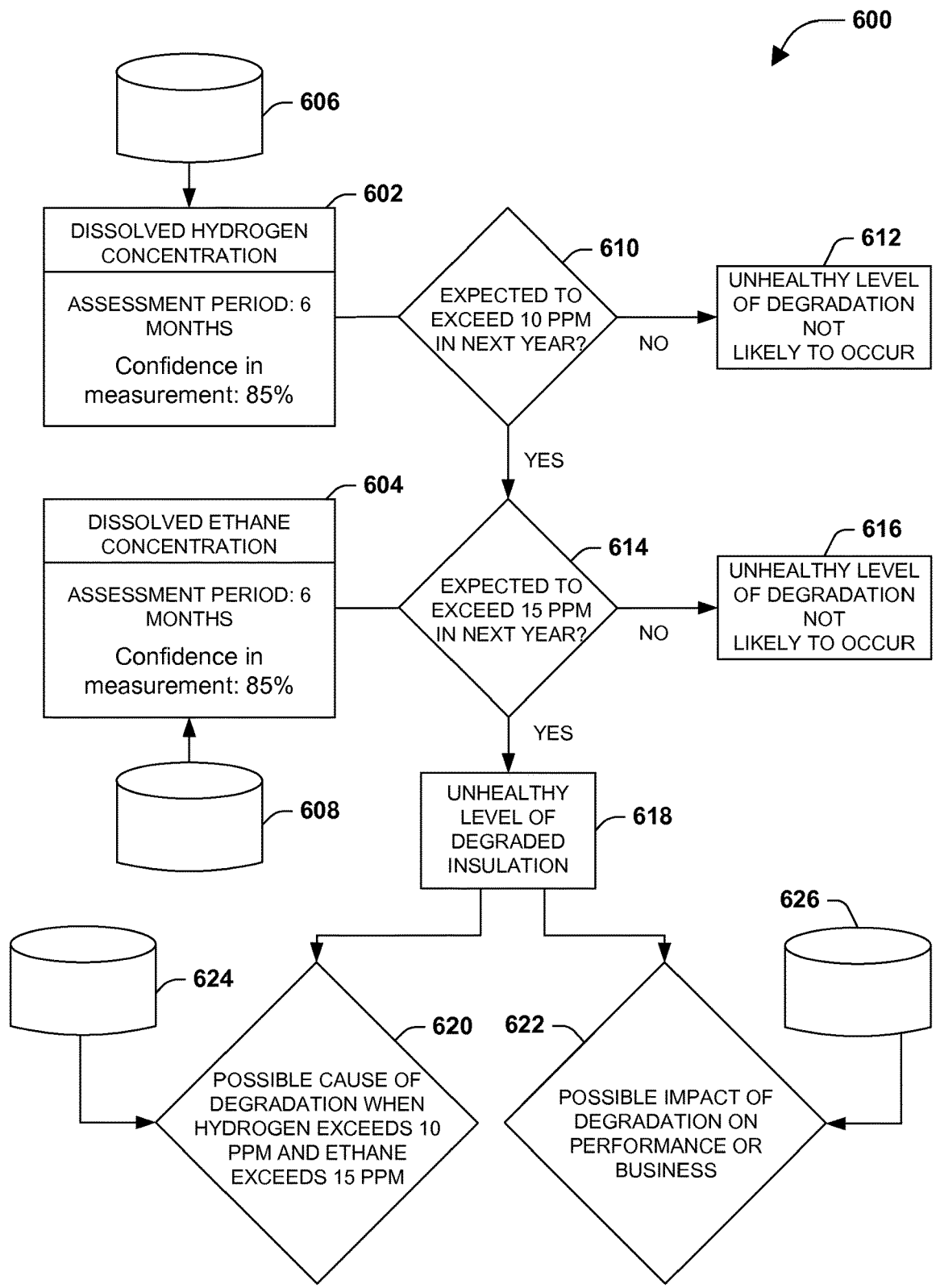
FIG. 6 illustrates an example model.

As further described with respect to FIG. 6, the model may include model parameters describing the data to be analyzed (e.g., type(s) of data to be considered by the model, timespan of data to be considered, a confidence in respective data types, etc.) and/or model logic describing how the data is to be analyzed (e.g., how respective types of data are to be processed, etc.).

The model may be developed at 204 using historical data associated with the industrial asset and/or historical data associated with other industrial assets that satisfy specified criteria. By way of example, in some embodiments, a data mining algorithm may be configured to analyze historical data associated with the industrial asset to identify patterns in the historical data which are predictive of conditions, impacts of the conditions, and/or causes of the conditions. As another example, the data mining algorithm may be configured to analyze historical data associated with a class of industrial assets to which the industrial asset is a member and/or historical data associated with a subset of industrial assets that operate in an environment similar to the industrial asset (e.g., operate under similar loading conditions, operate in similar weather conditions, etc.) to identify patterns in the historical data which are predictive of conditions, impacts of the conditions, and/or causes of the conditions.

In some embodiments, the model is developed at 204 by a subject matter expert with knowledge regarding the industrial asset and/or a class of industrial assets to which the industrial asset is a member. For example, the subject matter expert may have knowledge regarding operating properties of an industrial asset (e.g., dissolved gas concentrations, core temperature, ambient temperature, vibration measurements, wall thickness measurements, etc.) that may be indicative of a condition of the industrial asset and/or may facilitate identifying a cause(s) of such a condition. Accordingly, the subject matter expert may develop a model that uses data indicative of such operating properties to evaluate the probability that the condition may occur within a prediction period, to identify a cause of the condition, and/or to assess a likely impact of the condition on the industrial asset, the power system, and/or an entity (e.g., utility provider, power consumer, etc.).

It may be appreciated that while specific reference is made herein to developing a model for generating the health profile of an industrial asset, the model may be developed for a class of industrial assets which includes the industrial asset. That is, the model may not be developed specifically for use with the industrial asset (e.g., but rather may generated as one, of several, different models that can be used to develop health profiles for a class of industrial assets to which the industrial asset is a member), and the model may subsequently be selected to generate a health profile for the industrial asset. By way of example, the model may be developed for a particular class of industrial assets and/or a subset of industrial assets (e.g., where, as previously described, a subset may relate to a group of industrial assets that operate in similar environments, are members of a same voltage class, share a common manufacturer, are similar in age, etc.). An example method for identifying classes or subsets of industrial assets is described in further detail with respect to FIG. 11.

At 206 in the example method 200, the model is executed to generate the health profile of the industrial asset (e.g., as well as other industrial assets of interest that are members of a class or subset configured to analyzed by the model) (e.g., 110 in FIG. 1). The model may be executed on demand and/or may be executed programmatically based upon a defined set of rules (e.g., execute the model to update the health profile of the industrial asset once every 3 months, execute the model to update the health profile when a particular event occurs with respect to the industrial asset, execute the model when it is desirable to update a report, etc.).

The health profile describes an expected health of the industrial asset during a prediction period and is generated based upon data associated with the industrial asset that has been collected/generated within an assessment period.

The assessment period refers herein to a period of time during which data that forms the basis of the prediction is collected/generated. By way of example, data collected over the last year may be input into the model (e.g., where the last year is the assessment period). In some embodiments, the assessment period is specified when the model is developed or updated (e.g., and may be a model parameter). In other embodiments, the assessment period is specified (e.g., by a user) when the model is executed to generate a health profile for the industrial asset. By way of example, when a user desires to execute the model(s) for a particular industrial asset, a graphical interface may be presented that facilitates user entry of one or more parameters, such as desired assessment period and/or desired prediction period. The user may enter or select desired parameters, including a desired assessment period and/or a desired prediction period. By selecting an option to "run" the model(s), the model(s) may optionally be updated for the specified prediction and assessment period and other parameters, and then executed, or the selected model(s) may be executed with the desired parameters.

In some embodiments, the assessment period is relative in nature such that the assessment period is determined when the model is executed. By way of example, an assessment date and time may be specified when the model is executed (e.g., 'today', or midnight of the last day of the preceding month), and the assessment period may be defined by the model as a period starting two months prior to the assessment date and ending on the assessment date (e.g., thus the dates included within the assessment period are a function of when the model is executed). In other embodiments, the assessment period is static in nature. For example, the assessment period may be defined as the first three months of the industrial asset's operational life (e.g., which does not change based upon when the model is executed).

As further described with respect to FIGS. 3-5, the assessment period may include past, present, and/or future times. By way of example, the assessment period may be a period that extends from one year ago today until six months into the future. It may be appreciated that where the assessment period extends into the future, real data (e.g., data indicative of real measurements, observations, etc.) may be unavailable. Accordingly, in some embodiments, the data that is provided to the model may include estimations and/or forecasts derived from real data and/or a confidence in those estimations and/or forecasts. For example, data indicative of expected dissolved gas concentrations for the next 6 months may be generated based upon extrapolations and/or interpolations of data indicative of dissolved gas concentrations readings for the past 6 months, past year, etc. In still other embodiments, model logic is configured to perform such forecasting and thus the data that is received by the model is merely real data (e.g., data indicative of real measurements, observations, etc.).

In some embodiments, the assessment period may be different for different types of data to be analyzed by the model. By way of example, it may be desirable for the model to analyze data indicative of an ambient air temperature that has been collected over at least a one year span, while it may be desirable for the model to analyze data indicative of dissolved gas concentrations within the industrial asset collected over merely a 6 month span. Accordingly, an assessment period for data indicative of ambient air temperature may be 1 year and an assessment period for data indicative of dissolved gas concentrations may be 6 months.

The prediction period refers herein to a period of time during which a prediction is made. By way of example, it may be desirable to generate a health profile that predicts conditions of the industrial asset over the next 6 months (e.g., where the prediction period is a 6 month period starting today). As another example, it may be desirable to generate a health profile that predicts conditions of the industrial asset over the next 5 years (e.g., where the prediction period is a 5 year period starting today). As still another example, it may be desirable to generate a health profile that predicts conditions 1-2 years from now (e.g., where the prediction period starts 1 year from today and ends 2 years from today).

The prediction period may be included as a model parameter or may be determined when the model is executed. By way of example, in some embodiments, a data mining algorithm may determine, from the historical data, that the trends are merely valid for approximately a year (e.g., and thus the confidence in a prediction may be substantially reduced when predicting conditions/causes/impacts/etc. that may occur more than a year from today). Accordingly, a model parameter may be included within the model that provides that the prediction period may extend no further than one year from today. As another example, a user may specify the prediction period at the time the model is to be executed. As yet another example, it may be desirable to generate a health profile that predicts conditions from now through the end of life of the industrial asset, where the latest possible end of life for the asset may be partially or fully characterized in advance (e.g. via model parameters) or may be determined by the model.

To execute the model and generate a health profile, data to be analyzed by the model is retrieved from one or more data stores at 208.

In some embodiments, the data that is retrieved may be a function of the model parameters and/or the assessment period. By way of example, the model parameters may limit the volume of data retrieved to include merely one or more specific type(s) of data. Example types of data include, among other things, data indicative of dissolved gas concentrations, data indicative of internal temperatures, data indicative of loadings, data indicative of metal fatigue measurements, data indicative of ambient air temperatures, data indicative of humidity measurements, and/or data indicative of production output. As another example, the assessment period may limit the volume of data retrieved to include data collected/generated during merely a specified period of time.

In other embodiments, the data that is retrieved at 208 may include all or substantially all of the data associated with the industrial asset for which the health profile is being generated.

Executing the model also comprises analyzing the data based upon model logic and the prediction period at 210. The model logic describes a process by which the retrieved data is to be evaluated. For example, the model logic may describe how to compare different types of data, may describe trends to identify in the data, may describe the meaning of a trend, etc.

In some embodiments, the model logic may also describe a process by which a confidence is assigned to the data, a process by which the data is evaluated to generate a forecast (e.g., probability), and/or a process by which a confidence may be computed (e.g., where a higher confidence may be assigned to a first forecast relative to the confidence assigned to a second forecast based upon the quantity and/or quality of data used to generate the first forecast versus the second forecast). In some embodiments, such confidences may be used to weight the data when performing an analysis on the data and/or to weight a forecast, for example.

The example method 200 ends when a health profile of the industrial asset is generated indicative of an expected health of the industrial asset during the prediction period. As further described with respect to FIG. 7, such a health profile may include, among other things, an expected condition(s) of the industrial asset during the prediction period, a likely cause(s) of the condition(s), and/or an expected impact of the condition(s) on the industrial asset, a system comprising the industrial asset, and/or an entity. Such an impact may include a performance impact (e.g., energy output of the power system is likely to be reduced by 10%, 100 customers are expected to lose power, etc.) and/or a business impact (e.g., fines of approximately $2000 are expected to be levied against a utility provider due to a contamination leak, customer sentiment is expected to drop by 5 percentage points due to a failure, etc.), for example. It may be appreciated that example method 200 may be executed more than once on a given industrial asset (e.g., other models, sets of model parameters, assessment periods, and/or prediction periods may be used in various combinations to analyze the same asset, and thus that more than one health profile may be generated for an asset).

To further illustrate an assessment period and a prediction period, example graphs 300, 400, and 500 are provided. The graphs 300, 400 and 500 describe the concentration of dissolved hydrogen 302 in oil of a transformer based upon interpolations and/or extrapolations of actual measurements (e.g., by a sensor associated with the transformer and/or field testing of the transformer), which a model may be configured to analyze to forecast a health of the transformer during a prediction period. It may be appreciated that dissolved hydrogen concentration is merely one of many data types a model may consider when developing a health profile and thus dissolved hydrogen concentration is merely used as an example.

The y-axis 304 represents parts-per-million (ppm) and the x-axis 306 represents time. The assessment period 308 describes a time window of data samplings used to generate the health profile and the prediction period 310 describes a forecast window of interest. Thus, based upon the data acquired during the assessment period 308, one or more predictions or forecasts can be made about a state or health of the industrial asset during the prediction period 310. Further, a confidence may be computed based upon the quality and/or quantity of data available during the assessment period 308. By way of example, the confidence in a forecast may be less if merely four dissolved hydrogen measurements were taken during the assessment period 308, relative to the confidence if one hundred measurements were taken during the assessment period 308.

The assessment period 308 and/or the prediction period 310 may be user-defined (e.g., by a subject-matter expert at the time the model is developed and/or by a user executing the model to generate a health profile) and/or may be programmatically-defined (e.g., such as via a learning algorithm that determines the assessment period 308 and/or the prediction period 310 based upon patterns identified in historical data and/or goals of an entity executing the model, for example). In FIG. 3, the assessment period 308 is defined to be a 6-month span that ends three months from the present date. Thus, the assessment period 308 includes merely data indicative of actual dissolved hydrogen readings and/or interpolations therefrom during the 6-month span. In other embodiments, such as illustrated in FIGS. 4 and 5, the assessment period 308 includes periods of time for which no actual data has yet been collected, such as the present day and/or 1.5-month span into the future. Thus, in such embodiments, the assessment period 308 may include forecasts of dissolved hydrogen readings derived by extrapolating actual dissolved hydrogen readings, for example. The prediction period 310 typically temporally post-dates the assessment period 308 (e.g., but does not necessarily post-date the assessment period 308 as there may be some overlap between the assessment period and the prediction period)

and may or may not include a period of time over which dissolved hydrogen concentrations are forecasted. For example, in FIGS. 3 and 5, the prediction period includes a period of time over which dissolved hydrogen concentrations can be forecasted (e.g., with a specified degree of confidence in the extrapolation) whereas the prediction period 310 represented in FIG. 4 includes a period of time over which dissolved hydrogen concentrations cannot be forecasted (e.g., with the specified degree of confidence).

FIG. 6 illustrates an example model 600 which includes model logic (e.g., describing a process by which data is evaluated/analyzed) and model parameters (e.g., describing the types of data to be analyzed and the time period of data to be analyzed). In this example, the model 600 is configured to determine whether the insulation in a transformer is likely to degrade to an unhealthy level during a prediction period (e.g., where degraded insulation is a condition), to identify a possible cause of the degradation, and to identify an impact of the degradation. An unhealthy level of insulation degradation may be defined as an absolute expression or relative expression, may represent a condition or a trend in condition, may be discrete and/or may be represented by a profile or curve. As an example of a relative expression, the unhealthy level may be defined as a level that is less than would be expected for a transformer of that age and/or operating under conditions in which the transformer is operating.

To generate the model 600, a subject matter expert and/or a data mining algorithm may review historical data associated with the industrial asset and/or other industrial assets (e.g., industrial assets of a class to which the industrial asset belongs, industrial assets operating under similar conditions, etc.) to identify patterns which typically indicate that insulation may be degrading to an unhealthy level. By way of example, a subject matter expert may initially review maintenance reports to identify instances where a maintenance technician has indicated that the insulation has degraded to an unhealthy level. The subject matter expert may then review historical data acquired in the days, months, etc. leading up to the identification to identify patterns or trends that may indicate that insulation may be degrading to an unhealthy level. For example, the subject matter expert may discover that the dissolved hydrogen concentration in oil typically exceeds 10 ppm and the dissolved ethane concentration in the oil typically exceeds 15 ppm at times when insulation degradation has been identified in the maintenance reports. Based upon this discovery, the subject matter expert may create a model 600 that evaluates the dissolved hydrogen concentration and dissolved ethane concentration over a period of time to predict whether the insulation is likely to degrade to an unhealthy level within a prediction period.

Accordingly, in the example model 600, the subject matter expert may create a first set of model parameters 602 for data indicative of dissolved hydrogen concentrations and a second set of model parameters 604 for data indicative of dissolved ethane concentrations. The first set of model parameters 602 may include a reference to a first data store 606 from which data indicative of the dissolved hydrogen concentrations can be retrieved and an assessment period for the data indicative of the dissolved hydrogen concentrations. For example, in the illustrated embodiment, the first set of model parameters 602 specifies that the past 6 months of data is to be retrieved when the model 600 is executed. The first set of model parameters 602 may also describe a confidence in the quality of the data. For example, the subject matter expert may be aware that a sensor embedded within the industrial asset is configured to measure dissolved gas concentrations, including dissolved hydrogen concentrations, with a precision of +/−1.3 ppm, which may translate into a confidence of approximately 85%, for example. In other embodiments, such a confidence may be determined based upon manufacturing specifications of the sensor, which may be stored in an enterprise data system, for example.

The second set of model parameters 604 may include a reference to a second data store 608 (e.g., which may be the same data store as the first data store 606 or a different data store) from which data indicative of the dissolved ethane concentrations can be retrieved and an assessment period for the data indicative of the dissolved ethane concentrations. For example, in the illustrated embodiment, the second set of model parameters 604 specifies that the past 6 months of data is to be retrieved when the model 600 is executed. The second set of model parameters 604 may also describe a confidence in the quality of the data. For example, the same sensor may be used for measuring both dissolved hydrogen concentrations and dissolved ethane concentrations, which is assigned as a confidence of 85%.

When the method 600 is executed, the data referenced by the first set of model parameters 602 and data referenced by the second set of model parameters 604 may be retrieved from respective data stores 606, 608 and analyzed according to model logic of the model 600. By way of example, at 610 the model logic may provide for determining whether the dissolved hydrogen concentration is likely to exceed 10 parts-per-million (ppm) within the next year (e.g., which may be defined as the prediction period of interest for the health profile) based upon presents trends in the data over the past 6 months (e.g., based upon trends in data generated over the assessment period).

To make such a determination, the model logic may be configured to forecast the dissolved hydrogen concentration in the oil over the next year (e.g., by extrapolating the last 6 months of data indicative of dissolved hydrogen concentrations). In some embodiments, the model logic may be further configured to assign a confidence to the forecast. By way of example, over the past six months, over 1000 measurements may have been taken with merely a small deviation in such measurements. Accordingly, based upon the number of measurements taken within the last 6 months, the small deviation in such measurements, and the 85% confidence in the measurements, a high confidence score may be assigned to the forecast.

If a decision is made at 610 that the dissolved hydrogen concentration is not likely to exceed 10 ppm within the next year based upon the forecast, the model logic determines, at 612, that the insulation in the transformer is not likely to degrade to an unhealthy level within the prediction period, and the model 600 may stop analyzing the data. In other embodiments, the model may continue to analyze other data for other possible conditions.

It may be appreciated that while the example model 600 is configured to make a binary decision, in some embodiments, model logic of the model 600 is configured to output other information that may be useful to an entity reviewing the information output by the model 600. By way of example, the model 600 may generate a probability scale, where respective decisions are associated with a probability range. For example, the model 600 may assess the data indicative of dissolved hydrogen concentrations to compute a probability (e.g., probability range) that the dissolved hydrogen concentration will exceed 10 ppm in the next year and generate an output indicating the computed probability.

By way of example, the model logic may analyze the data and determine that there may be 50%-52% probability that the dissolved hydrogen concentration will exceed 10 ppm. In some embodiments, the model logic may further associate that probability with a confidence based upon the quality and/or quantity of data available from which to analyze dissolved hydrogen concentrations. By way of example, there may be a 95% confidence in the 50%-52% probability because the quality and/or quantity of data available from which to analyze dissolved hydrogen concentrations is high. If, based upon the computed probability and/or confidence, there is a sufficiently high probability and/or confidence that the insulation will have degraded to an unhealthy level, the model 600 may consider one or more other model parameters, such as dissolved ethane concentrations, to refine the probability that the insulation will have degraded to an unhealthy level. Otherwise, the model 600 may stop the evaluation and generate an output indicating that the probability that the insulation will have degraded to an unhealthy level is too low based upon the dissolved hydrogen concentrations to warrant further analysis. In other embodiments, the model 600 may look at a plurality of model parameters in combination before making any such determination regarding the probability that the insulation will have degraded to an unhealthy level.

Returning to the example model 600, if a decision is made at 610 that the dissolved hydrogen concentration is likely to exceed 10 ppm within the next year based upon the forecast, the model 600 may continue to analyze the data. For example, at 614 the model logic may provide for determining whether the dissolved ethane concentration is likely to exceed 15 ppm within the next year based upon presents trends in the data over the past 6 months (e.g., based upon trends in data generated over the assessment period). Accordingly, the model logic may be configured to forecast the dissolved ethane concentration in the oil over the next year and/or assign a confidence to the forecast.

If a decision is made at 614 that the dissolved ethane concentration is not likely to exceed 15 ppm within the next year, the model 600 determines, at 616, that the insulation in the transformer is not likely to degrade to an unhealthy level within the prediction period and the model 600 may stop analyzing the data. Again, while reference is made to generating a binary output, in other embodiments, the model logic may be configured to generate a probability and/or a confidence profile instead of and/or in addition to the binary output.

If a decision is made at 614 that the dissolved ethane concentration is likely to exceed 15 ppm within the next year, the model 600 may determine, at 618, that the insulation in the transformer is likely to degrade to an unhealthy level within the prediction period (e.g., within the next year). Further, the model 600 may perform an analysis to determine possible causes of the degraded insulation under those conditions at 620 and/or perform an analysis to determine a possible impact of the degraded insulation at 622.

By way of example, in some embodiments, the model logic may provide for reviewing maintenance logs, stored in a third data store 624, of the transformer and/or other transformers that may have had insulation degrade to an unhealthy level to determine possible causes of the degraded insulation given the elevated levels of hydrogen gas and ethane gas in the oil and/or to determine what sorts of remedial actions have been performed on the transformer (e.g., or other transformers) when the hydrogen gas and ethane gas were elevated to such levels. As an example, a review of the operating records may reveal that often a maintenance crew attributes degraded insulation to sustained overloading when the transformer is operating with such elevated levels. However, the maintenance crew also sometimes attributes the degraded insulation to a lightning strike. Thus, at 620, the model 600 may identify possible causes of the degraded insulation when the dissolved hydrogen concentration is exceeding 10 ppm and the dissolved ethane concentration is exceeding 15 ppm and may assign a probability to respective causes and/or a confidence to those probabilities (e.g., based upon the quality and/or quantity of data available from which to identify possible causes). By way of example, based upon historical data, there may be a 55% probability that the insulation degradation is due to sustained overloading and a 45% probability that the insulation degradation is due to lightning strikes.

As another example, the model logic may review performance logs, maintenance logs, and/or business logs stored in a fourth data store 626 to determine a possible impact of the insulation degrading to an unhealthy level, a probability that the impact will occur, and/or a confidence in the probability. By way of example, based upon performance logs, it may be determined that the probability of failure is low if the transformer operates for less than 1 month with the degraded insulation but increases to 80% if the transformer operates for at least 1 month with insulation that has degraded to an unhealthy level. Moreover, a service map may indicate that the transformer services 500 customers and that at least 100 of those customers are likely to experience an outage if the transformer fails (e.g., based upon the impact of previous failures by the transformer).

Based upon this analysis by the model 600, a health profile may be generated that indicates the predicted health of the transformer within the next year (e.g., within the prediction period). The health profile may include one or more conditions the transformer is likely to experience, possible causes of the condition, and/or possible impacts of the condition. By way of example, a health profile generated by the model 600 may include a notation that the insulation is likely to degrade to an unhealthy level within the next year due sustained overloading of the transformer. The notation may also provide that the likely impact of the degraded insulation is a failure of the transformer, which may result in an outage to customers and/or a negative impact on customer sentiment towards an entity responsible for the transformer. In some embodiments, the health profile may further indicate an expected cost to repair the insulation, information on how reducing a load on the transformer is likely to improve the health of the transformer (e.g., and minimize continued degradation), and/or other information which may be useful to assess the significance of the condition and/or a number of resources (e.g., money, man-power, etc.) needed to address the condition.

Figure 7:
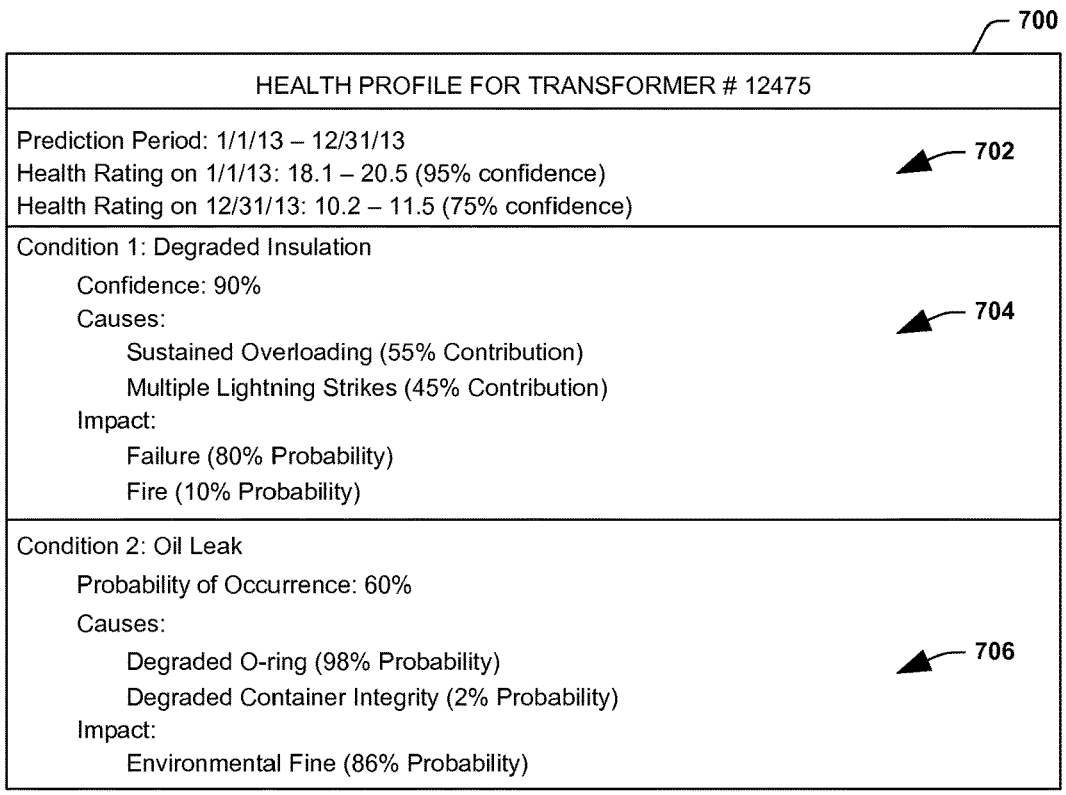
FIG. 7 illustrates an example health profile.

FIG. 7 illustrates an example health profile 700 of a transformer, which may be generated using one or more models. By way of example, the model 600 of FIG. 6 may be used to determine a probability that a first condition, degraded insulation, will occur to the transformer within the prediction period, and a second model may be used to determine a probability that a second condition, an oil leak, will occur to the transformer within the prediction period. In other embodiments, a single model may be developed that can be used to determine the probability of the first condition and the probability of the second condition.

The health profile 700 comprises a prediction period field 702 describing the period of time during which the health profile 400 is applicable and a current health rating of the industrial asset based upon possible conditions of the transformer during the prediction period. By way of example, in the illustrated embodiment, the prediction period begins on Jan. 1, 2013 and ends on Dec. 31, 2013. In some embodiments, the prediction period field 702 also includes one or more health ratings describing the overall health of the industrial asset at various times. For example, in the illustrated embodiment, the prediction period field 702 provides a first health rating describing the expected health of the transformer at the beginning of the prediction period and a second health rating describing the expected health of the transformer at the end of the prediction period. In other embodiments, the prediction period field 702 may further comprise a present health rating describing the present health of the transformer. A confidence measure in one or more of the health ratings may also be provided where the confidence describes the degree of certainty or reliability in the health rating.

The health profile 700 also comprises a first condition field 704 describing a first condition that the transformer may experience within the prediction period and a second condition field 704 describing a second condition that the transformer may experience within the prediction period. By way of example, in the illustrated embodiment, the first condition field 704 provides that there is a 92% confidence in the insulation becoming degraded to an unhealthy level within the prediction period. The first condition field 704 also describes likely causes of the degraded insulation and likely impacts of the degraded insulation. For example, 55% of the degraded insulation condition may be estimated to be attributed to sustained overloading, and 45% of the degraded insulation condition may be estimated to be attributed to repeated lightning strikes. Moreover, there is an 80% probability that the degraded insulation will lead to failure of the transformer and a 10% probability that the degraded insulation will lead to a fire event associated with the transformer.

In some embodiments, a model that is developed to generate a health profile may be programmatically updated (e.g., on a periodic or intermittent basis) based upon data that has been received since the model was developed and/or last updated. In this way, the model may be updated to reflect recent discoveries or patterns that were not evident in an initial set of data. Moreover, updating the model may facilitate addressing operational and/or physical changes to an industrial asset, a subset of industrial assets operating within similar environments, and/or a class of industrial assets to which the model pertains. By way of example, a model may be developed based upon historical data accumulated while a set of transformers comprised oil having a first composition. Since the model has been developed, the oil in a subset of the transformers may have been replaced with oil having a second composition. Accordingly, it may be desirable to update the model (e.g., including updating model parameters and/or model logic) in view of the change in oil composition.

Figure 8:
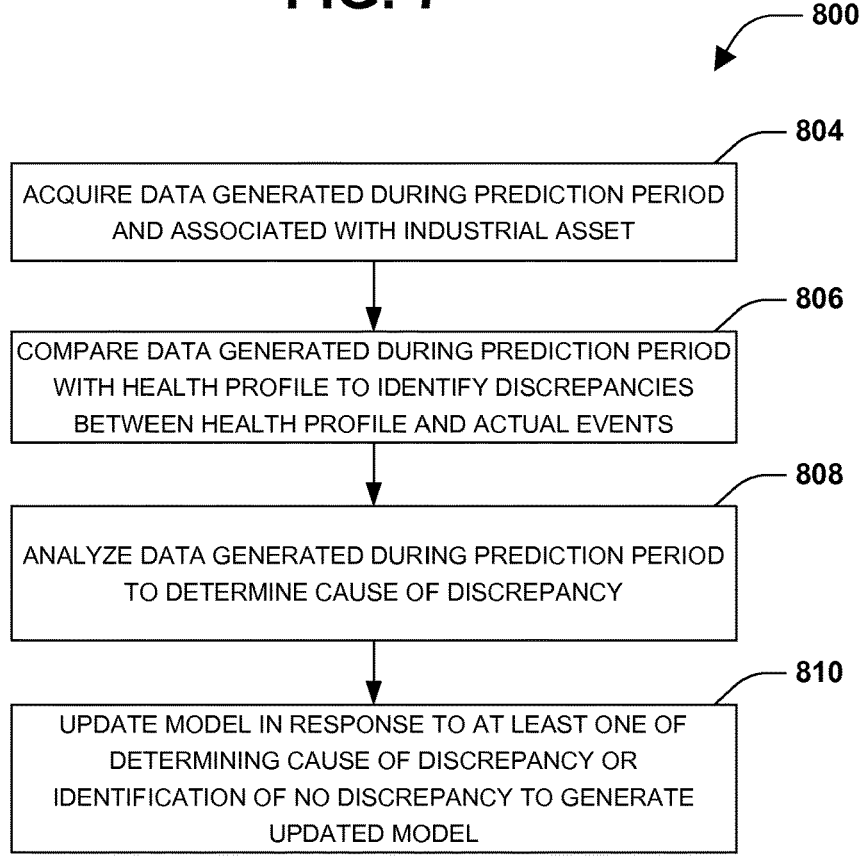
FIG. 8 illustrates an example method for updating a model configured to develop a health profile of an industrial asset.

FIG. 8 illustrates a flow diagram of an example method 800 for updating a model which predicts a condition of an industrial asset during a prediction period, a cause of the condition, and/or an impact of the condition.

At 804 in the example method 800 data generated during a prediction period and associated with the industrial asset is acquired. The data that is acquired may include data yielded from sensors embedded within the industrial asset, data yielded from field test and/or inspections, data yielded from maintenance reports, data yielded from enterprise systems (e.g., which indicate the load placed on the industrial asset and other operating conditions), and/or data yielded from external sources (e.g., such as temperature probes, humidity probes, etc.), for example. In some embodiments, the data that is acquired at 804 may also include data that was not generated during the prediction period but was generated since the model was initially developed and/or last updated.

While reference is made herein to acquiring data associated with a single industrial asset, data associated with a plurality of industrial assets may be acquired at 804. By way of example, data from a subset of industrial assets that were defined at 106 and/or 112 in the example method of FIG. 1 may be acquired at 804. In this way, a larger pool of data may be acquired (e.g., as opposed to the pool of data acquired if merely data associated with a single industrial asset were acquired) and used to identify trends, patterns, etc. that can be useful to consider when determining whether and/or how to update the model.

At 806 in the example method 800, the data generated during the prediction period and/or other acquired data is compared to a health profile of the industrial asset to identify discrepancies, if any, between the information in the health profile and actual events that occurred during the prediction period. For example, the data acquired at 804 may be analyzed to determine whether a predicted condition occurred during the prediction period, whether a predicted cause of the condition was identified, and/or whether a predicted impact of the condition occurred. As an example, maintenance reports generated during the prediction period may be analyzed to determine whether a maintenance technician notes that the industrial asset experienced a condition listed in the health profile.

As another example, maintenance reports generated during the prediction period may be analyzed to determine whether the maintenance technician repaired the industrial asset in a manner consistent with the type of repair expected to be performed for a cause listed in a health profile. By way of example, the health profile may indicate that an expected cause of degraded insulation in a transformer is overloading. If a maintenance report generated during the prediction period indicates that the insulation was degraded but operating reports do not indicate that the loading on the transformer was reduced after the identification of the degraded insulation (e.g., despite redundant transformers that a portion of the load could have been moved to), the likelihood that overloading was the cause of the degraded insulation may be reduced (e.g., unless during the analysis it can be determined that the operators were likely to have been either unaware of the degradation or unaware that load reduction might be a useful mitigation technique to slow the deterioration of insulation). As still another example, data generated during the prediction period and yielded from an enterprise system may be analyzed to determine whether one or more predicted impacts of a condition were felt. By way of example, data yielded from an enterprise system may be reviewed to determine if a transformer failed during a prediction period and if so, to determine the extent to which the failure may have been attributable to a predictable cause (e.g., degraded insulation as predicted in a health profile of the transformer).

If one or more discrepancies between the health profile and actual asset performance or events during the prediction period are identified, the data generated during the prediction period (e.g., and/or other data generated or acquired since the model was initially developed or last updated) is further analyzed at 808 to determine a cause(s) of the discrepancy (e.g., to determine what assumption and/or calculation may have caused an incorrect prediction). Such a review may include whether preemptive maintenance was performed that impacted the prediction (e.g., rendered the inaccurate prediction obsolete), whether unexpected operational changes and/or environmental changes impacted the prediction, whether forecasts developed to make the prediction were inaccurate (e.g., if operational loading was expected to continue at a certain level or trend but did not do so, or if dissolved hydrogen concentrations were expected to increase at a rate of 1 ppm per month but instead merely increased at a rate of 0.5 ppm per month, etc.), and/or whether one or more data types decreased or increased in validity as a predictor of a condition, cause, and/or impact (e.g., the oil in the transformer changed since the model was developed and dissolved ethane concentrations in oil are no longer a good predictor of degraded insulation), for example. In some embodiments, such a review may occur even if there were no discrepancies. By way of example, model logic and/or model parameters may be updated at 810 even if there are no discrepancies identified, to alter how predictions or confidences are computed (e.g., to increase a confidence in future predictions).

It may be appreciated that while the example method 800 describes comparing actual events of a single transformer to forecasted events of the transformer, in some embodiments, such updates may be made based upon the activity of a set of industrial assets (e.g., such as a subset of industrial assets that were formed at 106 and/or 112 in the example method 100 of FIG. 1). For example, health profiles may be generated for a subset of industrial assets describing the expected health of respective industrial assets during respective prediction periods. Actual data acquired from respective industrial assets during the prediction periods may be compared to the health profiles to identify discrepancies and/or accuracies in respective forecast. In this way, trends in the discrepancies and/or accuracies can be identified and used to adjust a model parameter and/or model logic, for example.

The following paragraphs provide examples of how the data may be reviewed at 808 to determine a cause of discrepancies and/or to determine whether/how to update a model. It may be appreciated that such examples are not intended to limit the scope of the application, including the scope of the claims.

In some embodiments, the analysis at 808 comprises evaluating whether an event or circumstance occurred that rendered a prediction obsolete and/or that was unpredictable. By way of example, the health profile may include a prediction that degraded insulation is likely to occur during a prediction period due to sustained overloading. If, upon a review of operational records, it appears that the loading on the transformer was substantially reduced before the prediction period began (e.g., and/or before the degradation was expected to occur), the lack of evidence suggesting degraded insulation during the prediction period may be attributed to pre-emptive actions. Accordingly, the discrepancy between the prediction and what actually occurred may be due to preemptive actions and not due to an inaccuracy of the model, for example (e.g., and the model may not be updated). As another example, the degraded insulation may be caused by an unexpected (e.g., unpredictable) event (e.g., a weather event such as storm surge) and not due to an inaccuracy of the model. Thus, the discrepancy is due to an unexpected event and not due to a feature of the model. As a further example, analysis of operational records and events may indicate that a weather event triggered a premature failure in a transformer with degraded insulation while similar weather events did not trigger premature failures in transformers with less-degraded insulation, in which case the analysis may conclude that risk of weather-related failure may be at least partially attributable to a weakened condition of the transformer due to degraded insulation.

In some embodiments, the analysis may attempt to identify previously undiscovered causes of a condition that may have factored into the discrepancy. By way of example, when a health profile of a transformer was generated, the health profile may have indicated that degraded insulation was expected due to overloading. However, upon an analysis of maintenance records generated during the prediction period, it may be determined that the transformer did in fact experience degraded insulation during the prediction period and that maintenance records indicated that the degraded insulation was due to a low level of oil in the transformer. Accordingly, a data mining algorithm may review the historical data (e.g., used to initially develop the model) and the data generated during the prediction period to determine how data patterns differ between degraded insulation attributed to overloading and degraded insulation attributed to low levels of oil. Based upon these findings, the model may be updated at 810 by updating at least one of a model parameter and/or model logic according to the findings.

In some embodiments, the analysis comprises comparing data generated during the prediction period to forecasts that provided a basis of the inaccurate prediction to determine if an inaccurate forecast caused the inaccurate prediction. By way of example, if degraded insulation was predicted based at least in part upon an expectation that a dissolved hydrogen concentration would increase to 10 ppm during the prediction period and the insulation did not degrade to an unhealthy level during the prediction period, the review may focus on whether the dissolved hydrogen concentration increased to at least 10 ppm during the prediction period. If the dissolved hydrogen concentration did not increase to 10 ppm, the analysis may focus on why the dissolved hydrogen concentration did not reach 10 ppm. For example, the data may be reviewed to determine if the forecast was incorrect and/or if a change was made to the industrial asset that rendered the forecast obsolete. For example, if maintenance was performed that likely impacted the dissolved hydrogen concentration and/or slowed a rate of dissolved hydrogen, the discrepancy between the prediction and what actually occurred during the prediction period may be attributed to the maintenance (e.g., instead of an inaccuracy in the model and the model may not be updated). If no maintenance was performed, it may be determined that the forecast was inaccurate and the model may be updated at 810 to improve the model logic that is configured to perform forecast the rate at which dissolved hydrogen concentrations change. If the dissolved hydrogen concentration reached 10 ppm during the prediction period, the analysis may reveal that dissolved hydrogen concentration is not a good predictor of degrading insulation and the model may be updated at 810 to remove dissolved hydrogen concentration as a relevant consideration when predicting whether insulation is likely to degrade to an unhealthy level during a prediction period.

At 810 in the example method 800, the model used to generate the health profile of the industrial asset is updated to generate an updated model in response to determining a cause of a discrepancy and/or in response to identifying no discrepancy. The updating may include updating one or more model parameters (e.g., updating the types of data used to make predictions included in a health profile) and/or updating model logic (e.g., updating a process by which the data is analyzed to render the predictions included in the health profile). It may be appreciated that where no inaccuracies were identified in the health profile, in some embodiments, the model is not updated. In other embodiments, the model may be updated even when no inaccuracies were identified. By way of example, the determination that there were no inaccuracies may improve the confidence in one or more predictions. Accordingly, the model may be updated to reflect the improvement in confidence.

The example method 800 ends after the model has been updated and/or after it is determined that no update to the model is desired.

Figure 9:
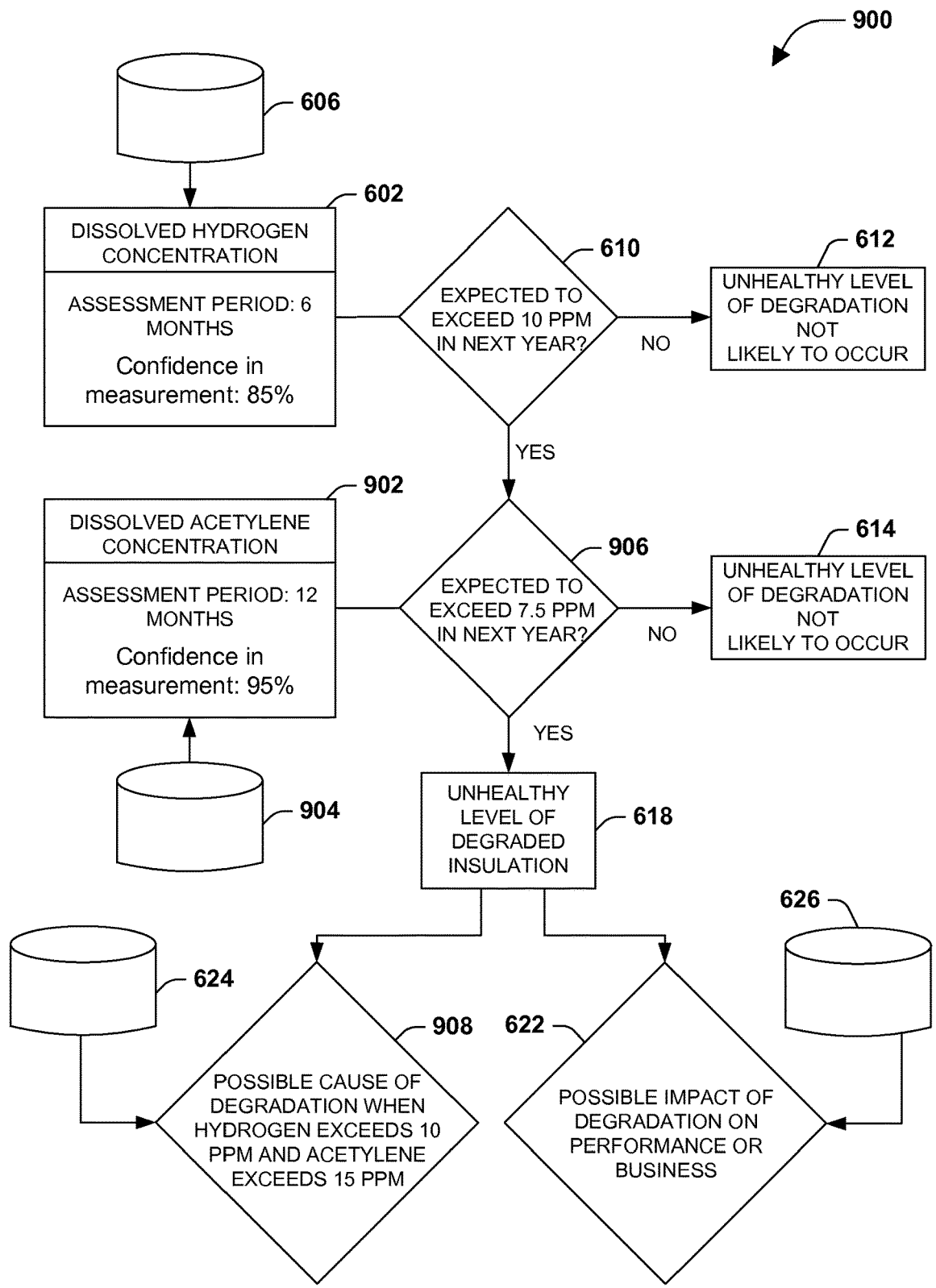
FIG. 9 illustrates an example of an updated model.

FIG. 9 illustrates an updated model 900 which may be derived by updating the model 600 of FIG. 6 according to the example method 800 of FIG. 8, for example.

When a health profile was generated according to the model 600 of FIG. 6, it may have been predicted with a high degree of certainty that insulation would degrade to an unhealthy level during the prediction period. However, when data generated during the prediction period was analyzed, it may have been determined that the insulation did not degrade to such a level and that the dissolved ethane concentration in oil of the transformer was not a reliable metric for predicting insulation degradation. Instead, the analysis may have revealed that the dissolved acetylene concentration is a more reliable metric for predicting insulation degradation.

Based upon these discoveries, the model 600 of FIG. 6 may be updated to generate the updated model 900, where reference to a dissolved ethane concentration is replaced with reference to a dissolved acetylene concentration. By way of example, a second set of model parameters 604 (e.g., for dissolved ethane) is replaced with a third set of model parameters 902 for dissolved acetylene concentration. The third set of model parameters 902 may include a reference to a fifth data store 904 comprising data indicative of the dissolved acetylene concentration measurements and an assessment period for the data indicative of the dissolved acetylene concentration measurements. By way of example, a sensor embedded within the transformer may not be configured to measure the concentration of dissolved acetylene in the oil, so the concentration of dissolved acetylene may be determined merely during field tests that occur quarterly. According, to have a sufficient number of data points from which to forecast whether the dissolved acetylene is likely to exceed a specified threshold (e.g., 7.5 ppm) during a prediction period, the assessment period may be 12 months instead of 6 months.

In some embodiments, a third set of model parameters 902 may further include a confidence in the dissolved acetylene concentration measurements. By way of example, based upon data yielded from enterprise systems, it may be known that the accuracy of field testing machines is +/−0.54 ppm, which translates into a confidence measurement of 95%. Accordingly, there may be a 95% confidence in dissolved acetylene concentration measurements whereas there is merely a confidence of 85% in the dissolved hydrogen concentrations measurements.

In the updated model 900, the model logic has also been updated to reflect the change in model parameters. By way of example, the updated model 900 includes a decision at 906 regarding whether the dissolved acetylene concentration is likely to exceed 7.5 ppm during the prediction period. As another example, the updated model includes a decision at 908 regarding a possible cause of degraded insulation when the dissolved hydrogen concentration exceeds 10 ppm and when the dissolved acetylene concentration exceeds 7.5 ppm.

In some embodiments, one or more predictions included within the health profile are associated with a confidence profile and is indicative of a certainty in the prediction. A number of factors may impact the confidence in a prediction. For example, as previously described, one factor that may impact the confidence in a prediction is the quality (e.g., reliability) of the data. For example, particular measurement tools may have a higher degree of accuracy than other measurement tools, which may cause some data to be more reliable than other data (e.g., information resulting from an analysis of dissolved acetylene concentration may be associated with a higher confidence than information resulting from an analysis of dissolved hydrogen concentrations because tools used to measure dissolved acetylene concentrations have a higher degree of accuracy). As another example, the data yielded from sensors or other measurement devices may be more reliable than observations by people because people introduce a degree of subjectivity or may be inconsistent in how they capture and record data. Another factor that may impact the confidence in a prediction is the quantity of the data which is the basis of the prediction. For example, the degree of confidence in a prediction may be higher when the number of data points used to make the prediction is 10,000 than when the number of data points used to make the prediction is 100. As another factor, some types of data may be better indicators of a condition than other types of data; thus the confidence in a condition may be a function of the type(s) of data used to predict the condition.

To improve the confidence in a prediction, in some embodiments, a diagnostic profile may be generated when the model is developed and/or updated. The diagnostic profile may be indicative of suggested diagnostic actions that may alter (e.g., improve) a confidence in a prediction, such as related to a condition, cause, and/or impact.

Figure 10:
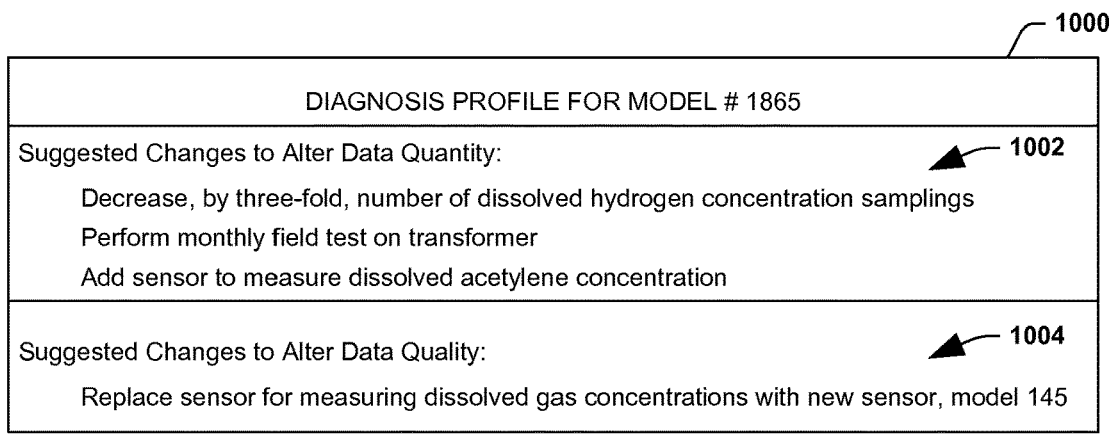
FIG. 10 illustrates an example diagnostic profile.

Referring to FIG. 10, an example diagnostic profile 1000 is illustrated. The diagnostic profile 1000 describes one or more diagnostic actions that may alter a confidence in the prediction made by a model. For example, in the illustrated embodiment, the diagnostic profile 1000 describes diagnostic actions that may improve a confidence in a prediction made by model number 1865 (e.g., the model illustrated in FIG. 9 of the instant application).

The diagnostic profile includes a first field 1002 comprising suggestions to alter a quantity of the data analyzed by the model and a second field 1004 comprising suggestions to alter a quality of data analyzed by the model.

For example, when data generated during a prediction period was reviewed to determine an accuracy of a health profile, it may have been determined that the amount of data indicative of dissolved hydrogen concentration measurements was excessive and that the confidence in the prediction would not change significantly (and/or would still provide false positive and false negative levels that were consistent with the desired levels) if the number of measurements were reduced by three-fold. Accordingly, a recommendation may be included within the first field 1002 to sample the dissolved hydrogen concentration less frequently (e.g., thus reducing the quantity of dissolved hydrogen samples).

As another example, based upon the data generated during the prediction period, it may be determined that the dissolved acetylene concentration in the oil is merely sampled once every three months when a field test is performed on the transformer. Accordingly, while the quality of the data may be very good (e.g., because the device which measures the dissolved acetylene concentration has a high degree of accuracy), the quantity of data may be low. Such a low quantity of data may result in a low confidence in a forecast of dissolved acetylene concentrations. Thus, a recommendation may be included within the first field 1002 to increase the sampling rate of dissolved acetylene to once monthly instead of once quarterly. As another example, a recommendation may be included within the first field 1002 to embed a sensor that is configured to measure acetylene within the transformer. While the sensor may lower the quality of data slightly, the increased quantity of data may outweigh the lower quality of data, resulting in a high confidence in forecast of dissolved acetylene concentrations.

As another example, as represented in the second field 1004, it may be determined from enterprise data, retrieved when the model was updated, that a new sensor is available that has a better accuracy with respect to dissolved hydrogen concentration measurements than a sensor presently embedded within the transformer. Accordingly, a recommendation may be included within the second field 1004 to replace the sensor embedded within the transformer with the new sensor because the new sensor will substantially improve the quality of data sampling, thus increasing a confidence in dissolved hydrogen concentration measurements, which will, in turn, substantially improve a confidence in forecast of the dissolved hydrogen concentration and/or in predictions regarding a condition of the transformer.

Figure 11:
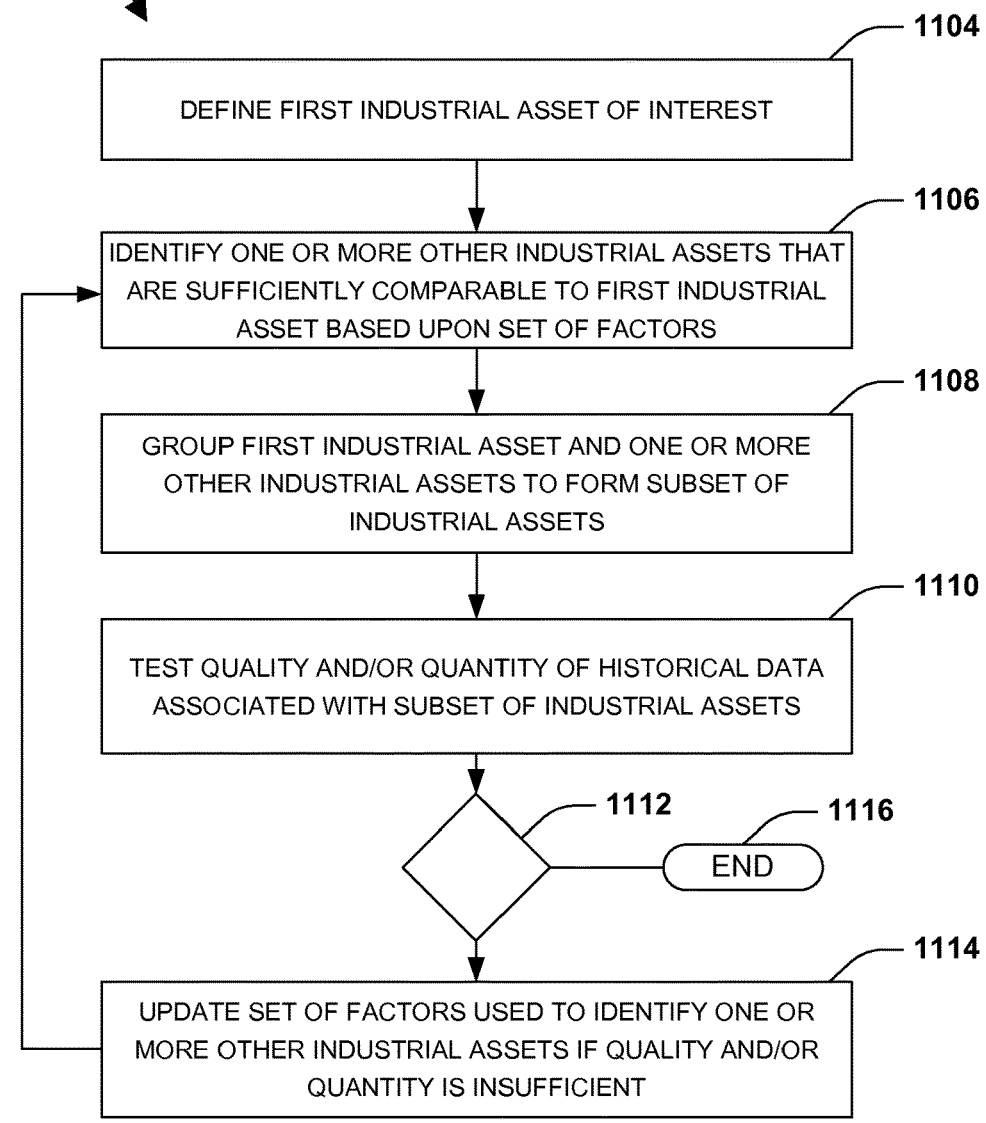
FIG. 11 is a flow diagram illustrating an example method for identifying comparable industrial assets.

As described with respect to FIG. 2, in some embodiments, the model may be generated and/or updated based upon available data from a set of similar industrial assets which define a subset of industrial assets (e.g., a set of comparable assets) (e.g., as described at 106 in FIG. 1). For example, historical data from a plurality of transformers operating under similar loading conditions in similar environments may be aggregated by a machine learning algorithm configured to generate the model based upon identified patterns in the historical data. FIG. 11 illustrates an example method 1100 for identifying comparable assets to create a set of industrial assets.

At 1104 in the example method 1100, a first industrial asset of interest is defined. The first industrial asset may be arbitrarily defined by a user, for example, desiring to develop a model which assesses the health of the first industrial asset.

At 1106 in the example method 1100, one or more other industrial assets are identified that are sufficiently comparable to the first industrial asset. As used herein, two industrial assets are sufficiently comparable when a degree of similarity, based upon a given set of factors (e.g., also referred to herein as criterion/criteria), exceeds a similarity threshold. The set of factors may relate to operating conditions of the industrial assets and/or environment conditions proximate the industrial assets, for example. By way of example, factors that may be analyzed to assess a degree of comparability may include, among other things, manufacturer, age (e.g., since manufacturing, deploying, etc.), type (e.g., dry, wet, amorphous, etc.), voltage class (e.g., 50 kV class, 80 kV class, etc.), model, features (e.g., lightning arrester, operating features, etc.), ambient air temperature of environment surrounding industrial asset, humidity content proximate industrial asset, usage (e.g., operating time, workload, etc.), event history (e.g., # of degradation events and/or non-degradation events), maintenance history (e.g., whether recommended maintenance was performed), industrial domain within which the industrial asset operates (e.g., residential domain, commercial domain, etc.), level of instrumentation (e.g., # and/or type of embedded sensors, etc.), and/or number of redundant assets (e.g., how many other assets are available that provide redundancy for the industrial asset).

The factors that are analyzed to assess the degree of comparability between a first industrial asset and other industrial assets may be specified by a user (e.g., a subject matter expert) and/or may be determined programmatically based upon historical data. For example, in some embodiments, an algorithm is configured to identify industrial assets that have tended to operate similarly based upon historical data and to identify features that those industrial assets have in common. Based upon the identified features, factors can be developed to consider when searching for and/or identifying assets that are sufficiently comparable to the first industrial asset.

At 1108 in the example method 1100, the first industrial asset and the one or more other industrial assets that are sufficiently comparable to the first industrial asset are grouped to form a subset of industrial assets.

At 1110 in the example method 1100, the quality and/or quantity of historical data associated with the subset of industrial assets is tested to evaluate whether a model can be generated and/or updated using the historical data. More particularly, the quality and/or quantity of historical data are tested to determine whether patterns can be identified with a specified degree of confidence, where the patterns serve as the basis for generating/updating the model.

In some embodiments, the output of the testing is a numerical score or other grading feature that describes the strength of the data (e.g., in terms of quality and/or quantity). If the strength of the data is below a threshold, a decision may be made at 1112 to update the set of factors at 1114. For example, if a numerical score of 0-50 (e.g., where 0 is worst and 100 is best) is associated with the data, the quality and/or quantity of the data set may be too weak for updating the model, and a decision may be made at 1112 to update the set of factors (e.g., broaden the factors to increase the number of industrial assets within a subset). If the strength of the data is above the threshold, a decision may be made at 1112 that the subset is a good subset, may end the method 1100 at 1116, and may proceed with selecting a model, updating a model, etc. as described in FIG. 1.

In some embodiments, if the strength of the data is above a second threshold, a decision may be made at 1112 to update the set of factors at 1114. For example, if a numerical score of 51-80 is associated with the data, a decision may be made at 1112 to end the method 1100 at 1116 and/or proceed with selecting a model, updating a model, etc. If a numerical score greater than 80 is associated with the data, the strength of the data may be so strong that the subset could be further sub-divided to reduce the data set (e.g., and thus more narrowly focus the model). Thus, a decision may be made at 1112 to update the set of factors at 1114 (e.g., by stratification, principal component analysis, etc.), to increase the number of factors and thus decrease the number of industrial assets within the subset (e.g., by adding additional criteria, such as manufacturer, to reduce the pool of industrial assets within the subset).

At 1114, the set of factors is updated and/or the similarity threshold is updated if the quality and/or quantity of historical data is insufficient to generate and/or update the model. For example, the number of factors that are considered may be reduced (e.g., lessening the number of filters) to increase the number of industrial assets that are sufficiently comparable to the first industrial. As another example, the similarity threshold may be reduced to increase the number of industrial assets that are sufficiently comparable to the first industrial asset. By way of example, the permissible manufacturing date range may be increased for a 5-year window to a 10-year window to increase the number of industrial assets that may be sufficiently comparable to the first industrial asset.

The process of identifying, grouping, and/or testing is then iteratively repeated until the quality and/or quantity of historical data is sufficient to generate and/or update a model.

The method 1100 ends at 1116 when the results of the test meets predetermined criteria and/or when other stopping criteria has been met.

Figure 12:
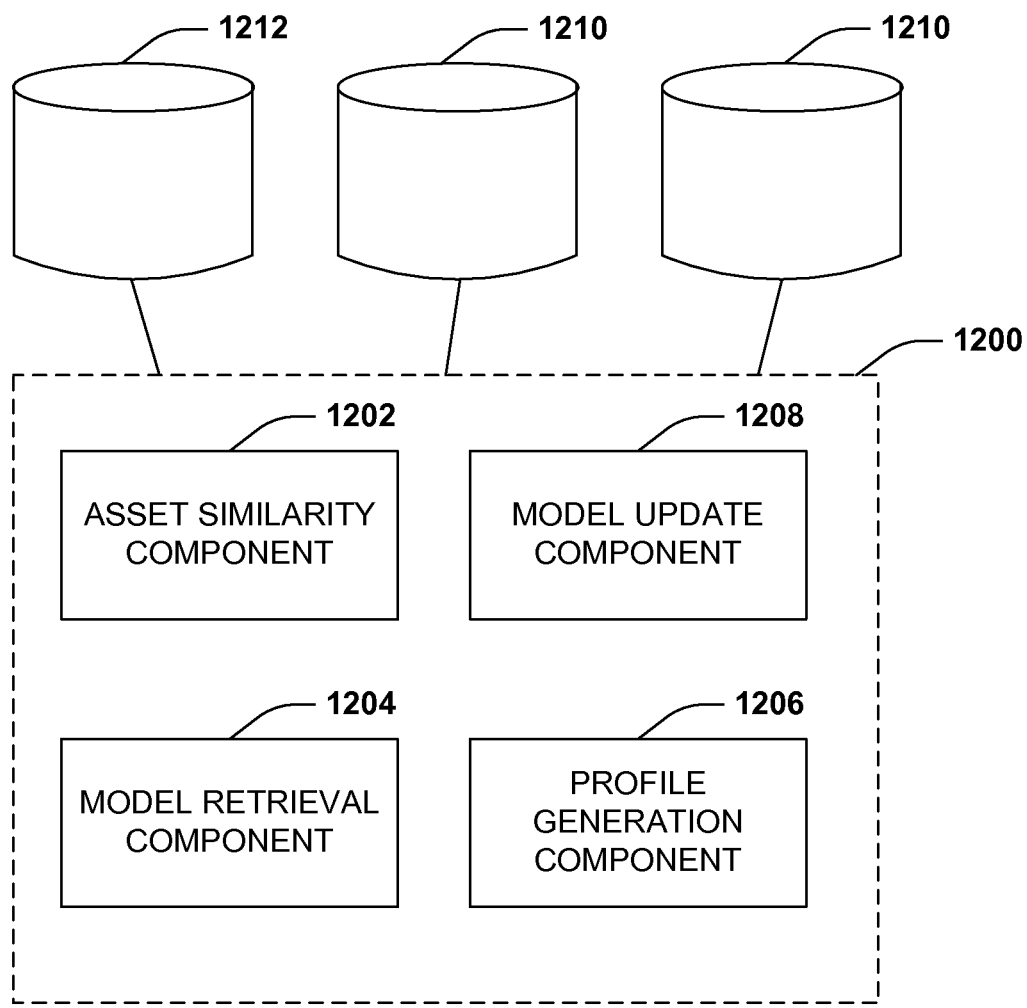
FIG. 12 is a component block diagram illustrating an example system for developing a health profile of an industrial asset.

Referring to FIG. 12, an example system 1200 for generating a health profile of an industrial asset is described. The example system 1200 may be operably coupled to one or more data stores 1210 from which data indicative of one or more industrial assets may be retrieved. The data may include nameplate data, operational data, environmental data, performance data, maintenance data, and/or other types of data which may be useful to determine how the industrial asset performs, an environment in which the industrial asset performs, and/or events that occur with respect to the industrial asset (e.g., outage events, fire events, maintenance events, etc.), for example.

The example system 1200 is configured to develop a health profile of an industrial asset based upon a model that has been developed using historical data from a set of industrial assets and comprises an asset similarity component 1202 (e.g., configured to perform divisions described in 106, 112, and/or 118 in the example method 100 of FIG. 1), a model retrieval component 1204 (e.g., configured to select a model at 108, 112, and/or 118 in the example method 100 of FIG. 1 and to retrieve the selected model), a profile generation component 1206 (e.g., configured to generate health profiles at 110 and/or 114 in FIG. 1), and a model update component 1208 (e.g., configured to evaluate health profiles at 116 and/or update a model at 118).

The asset similarity component 1202 is configured to identify industrial assets that have a sufficient degree of similarity, where similarity is evaluated based upon a set of one or more factors, as described earlier with respect to FIG. 11. For example, the factors may include performance factors and/or environmental factors. By way of example, in some embodiments, it may be desirable to develop a model based upon data yielded from a set of transformers that were manufactured within a specified two-year interval and that have a voltage capacity of 45 kV to 55 kV. Accordingly, nameplate data may be retrieved from a data source 1210 to identify transformers that match the specified criteria. As another example, it may be desirable to identify a set of transformers that were manufactured within a specified 10-year interval and operate under similar environmental conditions. Accordingly, nameplate data may be retrieved from a first data source 1210 and ambient air temperature data may be retrieved from a second data source 1210 to identify transformers that were manufactured during the specified time interval and experience similar changes in ambient air temperature. Other types of conditions that may be relevant when determining whether a set of industrial assets include sufficient similarity is average loading, average output, humidity fluctuations, air content (e.g., is there a high level of particulate matter in the air or a high concentration of salt in the air), and/or maintenance history (e.g., industrial assets that have had recommended maintenance may perform differently than industrial assets that have not had recommended maintenance), for example.

The model retrieval component 1204 is configured to retrieve one or more models from a model data store 1212 where models that have been developed for a particular class of industrial asset (e.g., transformer, circuit breaker, etc.) are stored. It may be appreciated that as described with respect to FIG. 1, in some embodiments, respective models may be associated with a subset of industrial assets (e.g., where these associations may change from time-to-time as trends are identified, additional data is collected, etc.). For example, a first model may be associated with a first subset of industrial assets and a second model may be associated with a second subset of industrial assets. Accordingly, when it is desirable to generate a health profile for an industrial asset that is a member of the first subset, the model retrieval component 1204 may retrieve the first model. When it is desirable to generate a health profile for an industrial asset that is a member of the second subset, the model retrieval component 1204 may retrieve the second model. Thus, in some embodiments, the model retrieval component stores associations between models and subsets, for example, and uses those associations to determine which model to retrieve based upon the industrial asset for which the health profile is being generated.

The profile generation component 1206 is configured to generate a health profile of an industrial asset using the model retrieved by the model retrieval component 1204. More particularly, the profile generation component 1206 is configured to retrieve data indicative of the industrial asset from one or more data stores referenced by the model and generated during an assessment period. The profile generation component 1206 is also configured to apply the retrieved data to the model, which then analyzes the data to generate the health profile. The health profile describes an expected condition of the industrial asset during a prediction period, a predicted cause of the expected condition, and/or a predicted impact of the expected condition, for example. The predicted impact may be a performance impact or a business impact, for example.

The model update component 1208 is configured to update models and to store the updated models in the model data store 1212 (e.g., for later retrieval by the model retrieval component 1204 when it is desirable to generate health profile using the updated model). In some embodiments, the model update component 1208 is configured to update one or more models based upon a comparison of the health profile generated by the profile generation component with data generated during the prediction period and indicative of the industrial asset. That is, stated differently, the model update component 1208 is configured to update the model based upon information about what was expected to happen during the prediction period with information about what actually happened during the prediction period. For example, the model update component 1208 may update model logic and/or a model parameter based upon discrepancies between the health profile and events, and/or based upon new patterns which can be identified in view of the data generated during the prediction period (e.g., which could not be identified merely based upon the historical data). An example method for model updating was described earlier in FIG. 8.

In some embodiments, at least one of the model development component 1204 and/or the model update component 1208 is further configured to generate a diagnostic profile indicative of a diagnostic action that may improve or alter a confidence of a model (e.g., improve or alter a confidence in a prediction the model is configured to make). In some embodiments, the diagnostic action may comprise a recommendation that will at least one of alter a quality of generated data or alter a quantity of generated data. By way of example, in some embodiments, the diagnostic action may comprise a recommendation to alter a frequency of data generation.

Figure 13:
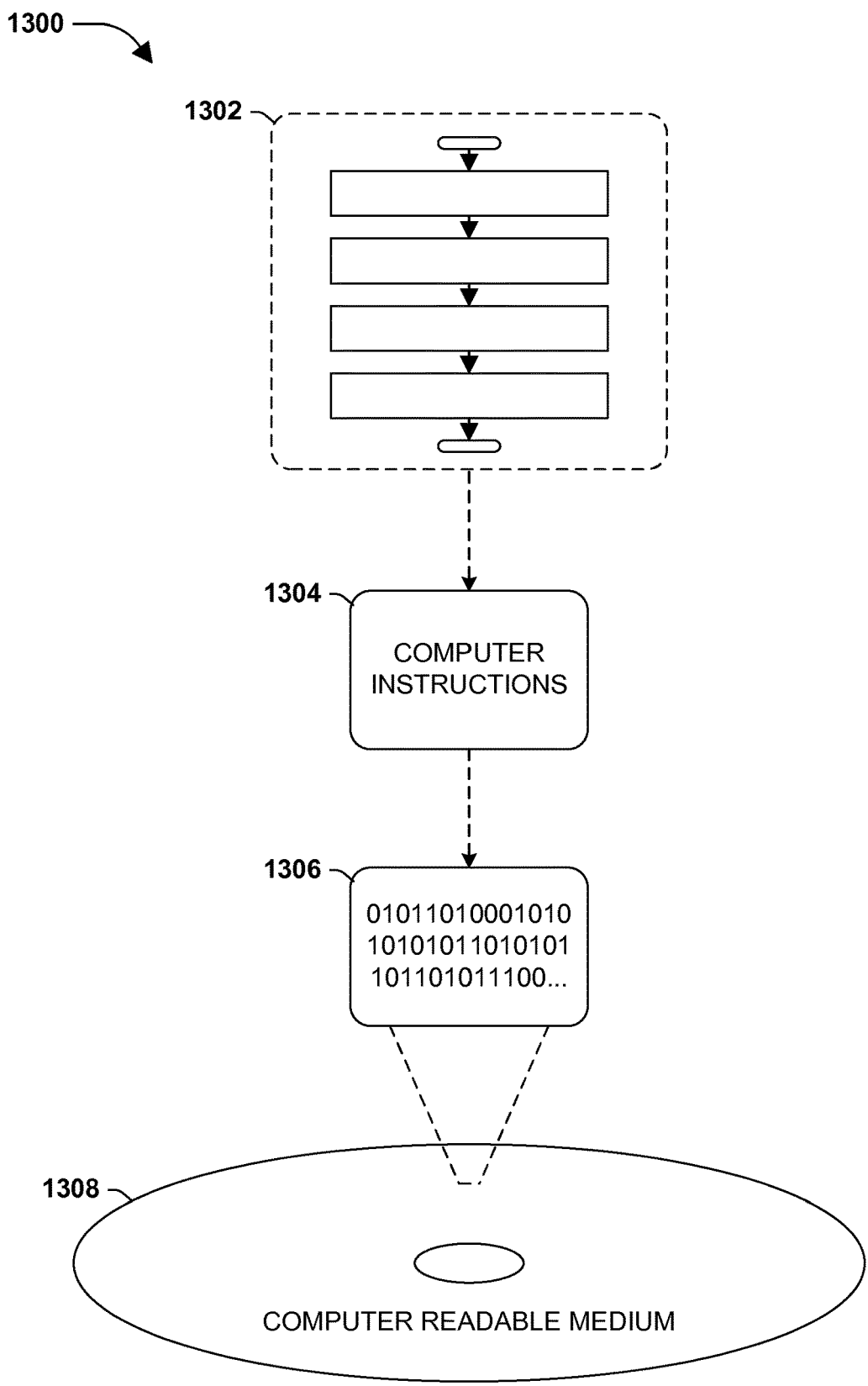
FIG. 13 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example computer-readable medium that may be devised in these ways is illustrated in FIG. 13, wherein the implementation 1300 comprises a computer-readable medium 1308 (e.g., a flash drive, CD-R, DVD-R, application-specific integrated circuit (ASIC), field-programmable gate array (FPGA), a platter of a hard disk drive, etc.), on which is encoded computer-readable data 1306. This computer-readable data 1306 in turn comprises a set of processor-executable instructions 1304 that when executed via a processing unit(s) is configured to operate according to one or more of the principles set forth herein. In some embodiments, the processor-executable instructions 1304 may be configured to perform an operation 1302, such as at least some of the example method 200 of FIG. 2, at least some of example method 800 of FIG. 8 and/or at least some of the example method 1100 of FIG. 11, for example. In other embodiments, the processor-executable instructions 1304 may be configured to implement a system, such as at least some of the example system 1200 of FIG. 12, for example. Many such computer-readable media may be devised by those of ordinary skill in the art that are configured to operate in accordance with one or more of the techniques presented herein.

Figure 14:
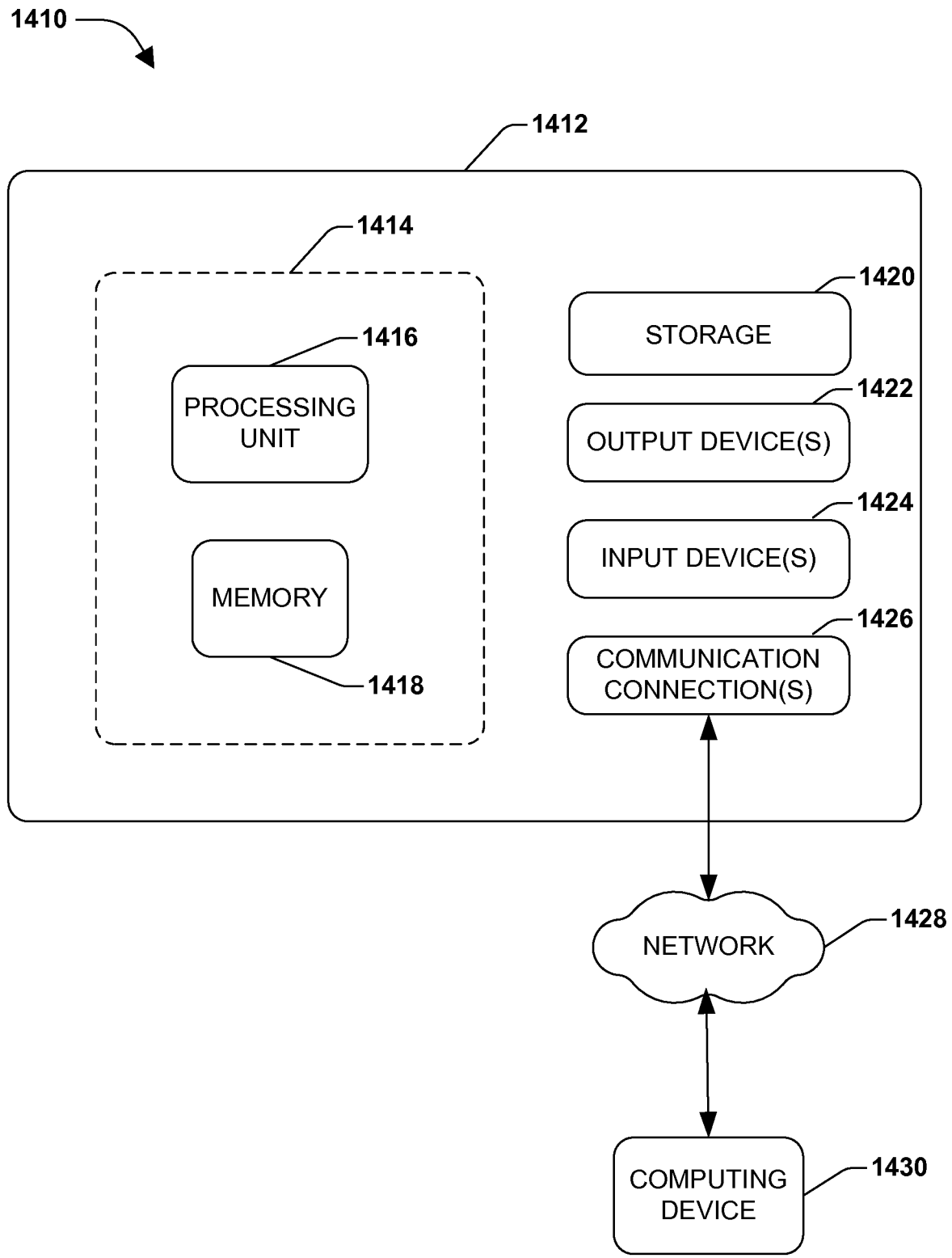
FIG. 14 illustrates an exemplary computing environment wherein one or more of the provisions set forth herein may be implemented.

FIG. 14 and the following discussion provide a brief, general description of a suitable computing environment to implement embodiments of one or more of the provisions set forth herein. The operating environment of FIG. 14 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of a system 1410 comprising a computing device 1412 configured to implement one or more embodiments provided herein. In one configuration, computing device 1412 includes at least one processing unit 1416 and memory 1418. Depending on the exact configuration and type of computing device, memory 1418 may be volatile (such as RAM, for example), non-volatile (such as ROM, flash memory, etc., for example), or some combination of the two. This configuration is illustrated in FIG. 14 by dashed line 1414.

In other embodiments, device 1412 may include additional features and/or functionality. For example, device 1412 may also include additional storage (e.g., removable and/or non-removable) including, but not limited to, magnetic storage, optical storage, and the like. Such additional storage is illustrated in FIG. 14 by storage 1420. In one embodiment, computer readable instructions to implement one or more embodiments provided herein may be in storage 1420. Storage 1420 may also store other computer readable instructions to implement an operating system, an application program, and the like. Computer readable instructions may be loaded in memory 1418 for execution by processing unit 1416, for example.

The term "computer readable media" as used herein includes computer storage media. Computer storage media includes volatile and nonvolatile, removable and non-removable media implemented in any method or technology for storage of information such as computer readable instructions or other data. Memory 1418 and storage 1420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1412. Any such computer storage media may be part of device 1412.

Device 1412 may also include communication connection(s) 1426 that allows device 1412 to communicate with other devices. Communication connection(s) 1426 may include, but is not limited to, a modem, a Network Interface Card (NIC), an integrated network interface, a radio frequency transmitter/receiver, an infrared port, a USB connection, or other interfaces for connecting computing device 1412 to other computing devices. Communication connection(s) 1426 may include a wired connection or a wireless connection. Communication connection(s) 1426 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1412 may include input device(s) 1424 such as keyboard, mouse, pen, voice input device, touch input device, infrared cameras, video input devices, and/or any other input device. Output device(s) 1422 such as one or more displays, speakers, printers, and/or any other output device may also be included in device 1412. Input device(s) 1424 and output device(s) 1422 may be connected to device 1412 via a wired connection, wireless connection, or any combination thereof. In one embodiment, an input device or an output device from another computing device may be used as input device(s) 1424 or output device(s) 1422 for computing device 1412.

Components of computing device 1412 may be connected by various interconnects, such as a bus. Such interconnects may include a Peripheral Component Interconnect (PCI), such as PCI Express, a Universal Serial Bus (USB), firewire (IEEE 1094), an optical bus structure, and the like. In another embodiment, components of computing device 1412 may be interconnected by a network. For example, memory 1418 may be comprised of multiple physical memory units located in different physical locations interconnected by a network.

Those skilled in the art will realize that storage devices utilized to store computer readable instructions may be distributed across a network. For example, a computing device 1430 accessible via a network 1428 may store computer readable instructions to implement one or more embodiments provided herein. Computing device 1412 may access computing device 1430 and download a part or all of the computer readable instructions for execution. Alternatively, computing device 1412 may download pieces of the computer readable instructions, as needed, or some instructions may be executed at computing device 1412 and some at computing device 1430.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B," where channel A and channel B may be two different channels, two identical channels, or the same channel.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. Similarly, illustrated ordering(s) of acts is not meant to be limiting, such that different orderings comprising the same or different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    performing a first diagnostic analysis of an industrial asset during a first time period to obtain first data;
    generating, using a model, a health profile for the industrial asset based upon the first data, the health profile describing a predicted condition of the industrial asset during a second time period subsequent to the first time period;
    performing a subsequent diagnostic analysis of the industrial asset during the second time period to obtain second data;
    evaluating the health profile for the industrial asset based upon the second data obtained via the diagnostic analysis of the industrial asset to determine whether there is a discrepancy between an actual condition of the industrial asset during a second time period and the predicted condition;
    responsive to a determination that there is a discrepancy between the actual condition and the predicted condition, obtaining operational record data indicative of operations that have been performed with the industrial asset prior to the prediction period and determining from the operational record data, whether a preemptive operation occurred that prevented the predicted condition from occurring;
    determining, in response to a determination that the preemptive operation did occur, not to update the model to account for the discrepancy or updating, in response to a determination that the preemptive operation did not occur, the model to create an updated model; and responsive to predicting that embedding a sensor configured to measure at least one of structural fatigue, vibrations or wall thickness will increase an accuracy of the generating the health profile by more than a threshold corresponding to a level of interference with operational performance of the industrial asset associated with the embedding of the sensor, facilitating an embedding of the sensor within the industrial asset based upon the updated model and generating an updated health profile for the industrial asset using the sensor.

2. The method of claim 1, wherein the updating the model comprises:

selecting a second model, different than the model, to use as the updated model.

3. The method of claim 2, wherein the industrial asset is sorted into a first subset of industrial assets based upon a first criterion associated with the model, and the method comprises:

re-sorting the industrial asset into a second subset of industrial assets based upon a second criterion associated with the second model.

4. The method of claim 1, comprising:

selecting the model, but not a second model, for generating the health profile based upon a safety criterion.

5. The method of claim 1, wherein the predicted condition is associated with structural fatigue, vibrations and wall thickness, the method comprising:

facilitating an embedding of a second sensor configured to measure vibrations; and facilitating an embedding of a third sensor configured to measure a wall thickness.

6. The method of claim 1, wherein the sensor is configured to measure at least one of an internal temperature or an ambient air temperature associated with the industrial asset.

7. The method of claim 1, comprising:

responsive to predicting that selection of a second model for generating the health profile would result in more than a threshold number of industrial assets being reclassified from having a first level of health to having a second level of health and that the reclassification would increase at least one of a cost factor or a resource burden beyond a threshold, selecting the model, but not the second model, for generating the health profile.

8. The method of claim 1, wherein the generating the health profile is based upon a combination of two or more of structural fatigue data for the industrial asset, gas concentration data for the industrial asset or temperature data for the industrial asset.

9. The method of claim 1, comprising:

sorting the industrial asset into a subset of industrial assets associated with the model based upon at least one of a voltage class, an operating environment, a manufacturer, an output production, or a loading capacity of the industrial asset.

10. The method of claim 1, comprising:

randomly selecting the model from a set of available models to use for generating the health profile.

11. The method of claim 1, wherein the updating the model comprises:

obtaining a set of data from a plurality of industrial assets;
pooling the set of data, using a machine learning algorithm, to identify a trend; and updating the model to create the updated model based upon the trend.

12. The method of claim 1, wherein the updating the model comprises:

obtaining a set of data from a plurality of industrial assets;
pooling the set of data, using a machine learning algorithm to identify a trend; and
selecting a second model, different than the model, to use as the updated model based upon the trend.

13. The method of claim 1, wherein the sensor is configured to measure a structural fatigue of the industrial asset.

14. The method of claim 1, comprising:

performing forecasting upon the first data to generate forecasted operational record data for the industrial asset; and the generating comprising generating the health profile based upon the forecasted operational record data.

15. A system, comprising:

a processor; and memory comprising processor-executable instructions that when executed by the processor cause performance of operations, the operations comprising:

performing a first diagnostic analysis of an industrial asset during a first time period to obtain first data;

generating, using a model, a health profile for an industrial asset based upon the first data, the health profile describing a predicted condition of the industrial asset during a second time period subsequent to the first time period;

performing a subsequent diagnostic analysis of the industrial asset during the second time period to obtain second data;

responsive to a determination that there is a discrepancy between the actual condition and the predicted condition, obtaining operational record data indicative of operations that have been performed with the industrial asset prior to the prediction period and determining, from the operational record data, whether a preemptive operation occurred that prevented the predicted condition from occurring;

determining, in response to a determination that the preemptive operation did occur, not to update the model to account for the discrepancy or updating, in response to a determination that the preemptive operation did not occur, the model to create an updated model; and responsive to predicting that replacing a first sensor configured to measure at least one of structural fatigue, vibrations or wall thickness with a second sensor configured to measure at least one of structural fatigue, vibrations or wall thickness will increase an accuracy of the generating the health profile by more than a threshold, facilitating replacement of the first sensor with the second sensor.

16. The system of claim 15, wherein the industrial asset is sorted into a first subset of industrial assets based upon a first criterion associated with the model, and the operations comprise:

re-sorting the industrial asset into a second subset of industrial assets based upon a second criterion associated with a second model.

17. The system of claim 15, the operations comprising:

performing forecasting upon the first data to generate forecasted operational record data for the industrial asset; and the generating comprising generating the health profile based upon the forecasted operational record data.

18. A non-transitory computer readable medium comprising processor-executable instructions that when executed cause performance of operations, the operations comprising:

performing a first diagnostic analysis of an industrial asset during a first time period to obtain first data;

generating, using a model, a health profile for the industrial asset based upon the first data, the health profile describing a predicted condition of the industrial asset during a second time period subsequent the first time period;

performing a subsequent diagnostic analysis of the industrial asset during the second time period to obtain second data;

responsive to a determination that there is a discrepancy between the actual condition and the predicted condition, obtaining operational record data indicative of operations that have been performed with the industrial asset prior to the prediction period and determining, from the operational record data, whether a preemptive operation occurred that prevented the predicted condition from occurring;

determining, in response to a determination that the preemptive operation did occur, not to update the model to account for the discrepancy or updating, in response to a determination that the preemptive operation did not occur, the model to create an updated model; and responsive to predicting that embedding a sensor configured to measure at least one of structural fatigue, vibrations or wall thickness will increase an accuracy of the generating the health profile by more than a threshold corresponding to a level of interference with operational performance of the industrial asset associated with the embedding of the sensor, facilitating an embedding of the sensor within the industrial asset based upon the updated model.

19. The method of claim 1, wherein generating the health profile is based upon a combination of two or more of structural fatigue data for the industrial asset, gas concentration for the industrial asset or temperature data for the industrial asset.

20. The method of claim 1 further comprising:

determining whether a probability of the predicted condition occurring satisfies a reference threshold and, in response to a determination that the probability satisfies the reference threshold, adding additional parameters to the model to reevaluate the probability of the predicted condition.

* * * * *